United States Patent
Hirashima et al.

(10) Patent No.: US 11,180,823 B2
(45) Date of Patent: Nov. 23, 2021

(54) HIGH-STRENGTH GALVANIZED STEEL SHEET AND METHOD FOR PRODUCING THE SAME

(71) Applicant: JFE Steel Corporation, Tokyo (JP)

(72) Inventors: Takuya Hirashima, Tokyo (JP); Tatsuya Nakagaito, Tokyo (JP); Masaki Koba, Tokyo (JP); Tatsuya Ehashi, Tokyo (JP); Makoto Imamura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 118 days.

(21) Appl. No.: 16/484,563

(22) PCT Filed: Apr. 19, 2017

(86) PCT No.: PCT/JP2017/015714
§ 371 (c)(1),
(2) Date: Aug. 8, 2019

(87) PCT Pub. No.: WO2018/146828
PCT Pub. Date: Aug. 16, 2018

(65) Prior Publication Data
US 2020/0032364 A1    Jan. 30, 2020

(30) Foreign Application Priority Data
Feb. 10, 2017 (JP) .............................. JP2017-022934

(51) Int. Cl.
*C21D 6/00* (2006.01)
*C21D 9/46* (2006.01)
(Continued)

(52) U.S. Cl.
CPC .............. *C21D 9/46* (2013.01); *B32B 15/012* (2013.01); *B32B 15/013* (2013.01); *B32B 15/04* (2013.01);
(Continued)

(58) Field of Classification Search
CPC ........ C21D 2211/009; C21D 2211/002; C21D 2211/005; C21D 2211/008; C21D 8/0247;
(Continued)

(56) References Cited

U.S. PATENT DOCUMENTS 8,197,617 B2    6/2012  Nakaya et al.
2013/0167980 A1*  7/2013  Kawata .................... C23C 2/02
                                                                148/504
(Continued)

FOREIGN PATENT DOCUMENTS

CN    1846011 A    10/2006
CN    1900344 A     1/2007
(Continued)

OTHER PUBLICATIONS

Non Final Office Action for U.S. Appl. No. 16/475,426, dated Mar. 24, 2021, 8 pages.
(Continued)

*Primary Examiner* — Michael E. La Villa
(74) *Attorney, Agent, or Firm* — RatnerPrestia

(57) ABSTRACT

Provided are a high-strength galvanized steel sheet having excellent delayed fracture resistance by reducing the diffusible hydrogen content in the steel and a method for producing the same. The high-strength galvanized steel sheet includes a steel sheet having a prescribed composition and a microstructure including martensite and tempered martensite, the total area fraction of the martensite and the tempered martensite being 30% or more, and a galvanizing layer formed on the surface of the steel sheet. The diffusible
(Continued)

hydrogen content in the high-strength galvanized steel sheet is 0.50 wt. ppm or less. The half-width of the hydrogen release peak of the high-strength galvanized steel sheet is 70° C. or less. The diffusible hydrogen content and the half-width of the hydrogen release peak are determined by a prescribed analysis method.

28 Claims, 1 Drawing Sheet

(51) Int. Cl.
| | |
|---|---|
| C21D 8/02 | (2006.01) |
| C22C 38/54 | (2006.01) |
| C22C 38/50 | (2006.01) |
| C22C 38/48 | (2006.01) |
| C22C 38/44 | (2006.01) |
| C22C 38/42 | (2006.01) |
| C22C 38/06 | (2006.01) |
| C22C 38/58 | (2006.01) |
| C22C 38/02 | (2006.01) |
| C22C 38/00 | (2006.01) |
| B32B 15/01 | (2006.01) |
| C23C 2/04 | (2006.01) |
| C23C 2/40 | (2006.01) |
| C23C 2/28 | (2006.01) |
| C25D 7/06 | (2006.01) |
| C25D 5/50 | (2006.01) |
| C23C 2/06 | (2006.01) |
| C22C 38/12 | (2006.01) |
| C22C 38/14 | (2006.01) |
| C22C 38/18 | (2006.01) |
| C22C 38/22 | (2006.01) |
| C22C 38/20 | (2006.01) |
| C22C 38/04 | (2006.01) |
| C22C 38/60 | (2006.01) |
| C23C 28/02 | (2006.01) |
| C22C 38/32 | (2006.01) |
| C22C 38/08 | (2006.01) |
| B32B 15/18 | (2006.01) |
| C22C 38/24 | (2006.01) |
| C23C 30/00 | (2006.01) |
| C22C 38/26 | (2006.01) |
| C22C 38/40 | (2006.01) |
| C22C 38/16 | (2006.01) |
| C22C 38/38 | (2006.01) |
| C22C 38/46 | (2006.01) |
| C22C 38/28 | (2006.01) |
| B32B 15/04 | (2006.01) |
| C25D 3/56 | (2006.01) |

(52) U.S. Cl.
CPC ........... *B32B 15/043* (2013.01); *B32B 15/18* (2013.01); *C21D 6/002* (2013.01); *C21D 6/004* (2013.01); *C21D 6/005* (2013.01); *C21D 6/008* (2013.01); *C21D 8/02* (2013.01); *C21D 8/0205* (2013.01); *C21D 8/0226* (2013.01); *C21D 8/0236* (2013.01); *C21D 8/0247* (2013.01); *C21D 8/0263* (2013.01); *C21D 8/0278* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *C23C 2/04* (2013.01); *C23C 2/06* (2013.01); *C23C 2/28* (2013.01); *C23C 2/40* (2013.01); *C23C 28/021* (2013.01); *C23C 28/023* (2013.01); *C23C 28/025* (2013.01); *C23C 30/00* (2013.01); *C23C 30/005* (2013.01); *C25D 5/50* (2013.01); *C25D 7/0614* (2013.01); *C21D 2211/002* (2013.01); *C21D 2211/005* (2013.01); *C21D 2211/008* (2013.01); *C21D 2211/009* (2013.01); *C25D 3/562* (2013.01); *C25D 3/565* (2013.01); *Y10T 428/12757* (2015.01); *Y10T 428/12799* (2015.01); *Y10T 428/12951* (2015.01); *Y10T 428/12958* (2015.01); *Y10T 428/12972* (2015.01)

(58) Field of Classification Search
CPC .. C21D 8/0236; C21D 8/0205; C21D 8/0226; C21D 8/0263; C21D 8/02; C21D 8/0278; C21D 9/46; C21D 6/004; C21D 6/005; C21D 6/008; C21D 6/002; C22C 38/60; C22C 38/20; C22C 38/04; C22C 38/12; C22C 38/14; C22C 38/18; C22C 38/22; C22C 38/001; C22C 38/002; C22C 38/005; C22C 38/02; C22C 38/06; C22C 38/42; C22C 38/44; C22C 38/48; C22C 38/50; C22C 38/54; C22C 38/58; C22C 38/08; C22C 38/16; C22C 38/24; C22C 38/26; C22C 38/28; C22C 38/32; C22C 38/38; C22C 38/40; C22C 38/46; C22C 38/008; C23C 30/00; C23C 30/005; C23C 28/025; C23C 28/023; C23C 28/021; C23C 2/06; C23C 2/04; C23C 2/40; C23C 2/28; C25D 5/50; C25D 7/0614; C25D 3/562; C25D 3/565; B32B 15/012; B32B 15/013; B32B 15/04; B32B 15/043; B32B 15/18; Y10T 428/12799; Y10T 428/12951; Y10T 428/12958; Y10T 428/12972; Y10T 428/12757
See application file for complete search history.

(56) References Cited

U.S. PATENT DOCUMENTS

| | | | |
|---|---|---|---|
| 2014/0087208 A1* | 3/2014 | Toda | C22C 38/18 428/659 |
| 2014/0234658 A1 | 8/2014 | Nozaki et al. | |
| 2016/0214351 A1 | 7/2016 | Harako et al. | |
| 2016/0319385 A1 | 11/2016 | Hasegawa et al. | |
| 2017/0275726 A1 | 9/2017 | Hasegava et al. | |
| 2020/0032364 A1 | 1/2020 | Hirashima et al. | |

FOREIGN PATENT DOCUMENTS

| | | |
|---|---|---|
| CN | 101351570 A | 1/2009 |
| CN | 101724776 A | 6/2010 |
| CN | 103827341 A | 5/2014 |
| EP | 1666624 A1 | 6/2006 |
| EP | 1746177 A1 | 1/2007 |
| EP | 1975266 A1 | 10/2008 |
| EP | 2182080 A1 | 5/2010 |

(56) References Cited

FOREIGN PATENT DOCUMENTS

| EP | 2508640 A1 | 10/2012 |
|---|---|---|
| EP | 2762600 A1 | 8/2014 |
| EP | 3040440 A1 | 7/2016 |
| EP | 3050989 A1 | 8/2016 |
| EP | 3187607 A1 | 7/2017 |
| JP | 10317121 A | 12/1998 |
| JP | 11279691 A | 10/1999 |
| JP | 2007321236 A | 12/2007 |
| JP | 2010111891 A | 5/2010 |
| JP | 2011111675 A | 6/2011 |
| JP | 2013108154 A | 6/2013 |
| JP | 2017048412 A | 3/2017 |
| KR | 20100001330 A | 1/2010 |
| WO | 2013047836 A1 | 4/2013 |
| WO | 2015029404 A1 | 3/2015 |
| WO | 2016031165 A1 | 3/2016 |

OTHER PUBLICATIONS

International Search Report and Written Opinion for International Application No. PCT/JP2017/015714, dated Jul. 25, 2017—6 pages.
Partial Supplementary European Search Report for European Application No. 17 895 615.7, dated Nov. 18, 2019, 19 pages.
Chinese Office Action with Search Report for Chinese Application No. 201780086013.7, dated Nov. 27, 2020, 8 pages.
Extended European Search Report for European Application No. 17 895 615.7, dated Apr. 1, 2020, 16 pages.
Final Office Action for U.S. Appl. No. 16/475,426, dated Jul. 1, 2021, 8 pages.

* cited by examiner

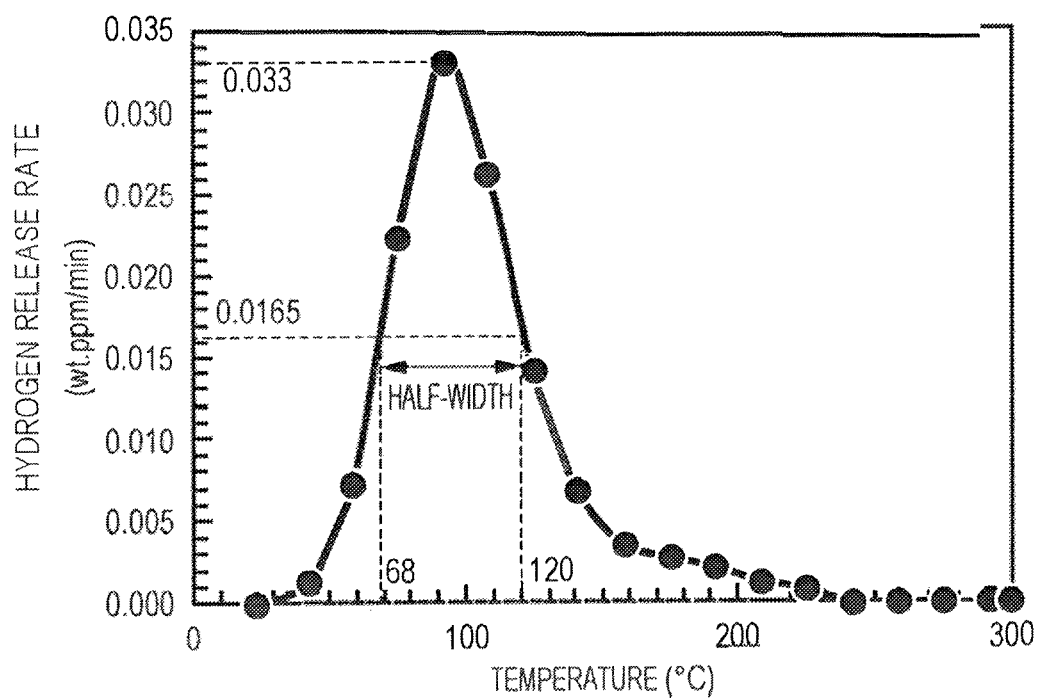

HIGH-STRENGTH GALVANIZED STEEL SHEET AND METHOD FOR PRODUCING THE SAME

CROSS REFERENCE TO RELATED APPLICATIONS

This is the U.S. National Phase application of PCT/JP2017/015714, filed Apr. 19, 2017, which claims priority to Japanese Patent Application No. 2017-022934, filed Feb. 10, 2017, the disclosures of these applications being incorporated herein by reference in their entireties for all purposes.

FIELD OF THE INVENTION

The present invention relates to a high-strength galvanized steel sheet used for producing automotive components and the like and a method for producing the high-strength galvanized steel sheet. The present invention relates specifically to a high-strength galvanized steel sheet excellent in delayed fracture resistance and a method for producing such a high-strength galvanized steel sheet.

BACKGROUND OF THE INVENTION

From the viewpoint of protecting the global environment, an improvement in the fuel economy of automobiles has recently become an important issue. To deal with this, efforts are actively underway to reduce the weight of automotive bodies by increasing the strength of steel sheets used for automotive bodies and using the steel sheets with smaller thicknesses.

Increases in the strengths of the steel sheets may involve the occurrence of delayed fracture (hydrogen embrittlement). Technologies for improving delayed fracture resistance have been applied to only particular steel products, such as bolts, steel bars, and thick steel plates. However, delayed fracture may occur even in a thin steel sheet in the case where the thin steel sheet is a coated steel sheet used for producing automobiles, because the coating reduces the likelihood of unwanted hydrogen that has been entered into the steel sheet in the production of the steel sheet becoming released from the steel sheet.

For example, Patent Literature 1 describes a patent on a technology in which a delayed fracture property is improved by addition of a large amount of B. In summary, there are provided a hot-dip galvanized steel sheet and a hot-dip galvannealed steel sheet that have a tensile strength of 1180 MPa or more and a good delayed fracture property. The steel sheets contain, by mass, C: 0.11% to 0.20%, Si: 0.001% to 0.35%, Mn: 2.0% to 3.0%, P: 0.1% or less, S: 0.01% or less, sol. Al: 0.001% to 1.5%, Ti: 0.001% to 0.30%, N: 0.02% or less, and B: 0.0021% to 0.0080% or less and optionally contain an adequate amount of one or more elements selected from Nb, V, Cr, Mo, Cu, Ni, Ca, REM, and Bi. The composition of the steel sheets satisfies the formula (15×sol. Al+100×Ti mathematics 1.5). The fraction of retained austenite is 7% by volume or less.

Patent Literature 2 provides a high-strength steel sheet having good elongation, good stretch flange formability, good weldability, excellent delayed fracture resistance, and a tensile strength of about 980 MPa or more. The high-strength steel sheet is produced using steel having a composition containing C: 0.12% to 0.25%, Si: 1.0% to 3.0%, Mn: 1.5% to 3.0%, P: 0.15% or less, S: 0.02% or less, and Al: 0.4% or less, with the balance being Fe and inevitable impurities. The mass ratio of the Si content to the C content (Si/C) is 7 to 14. The fractions of the following microstructures to all microstructures which are determined in a longitudinal cross-section of the steel sheet satisfy the following: 1) bainitic ferrite: 50% or more, 2) lath retained austenite: 3% or more, 3) block retained austenite: 1% or more to ½×Lath austenite fraction, and 4) the average size of the block second phase is 10 μm or less.

PATENT LITERATURE

PTL 1: Japanese Unexamined Patent Application Publication No. 2013-108154
PTL 2: Japanese Unexamined Patent Application Publication No. 2007-321236

SUMMARY OF THE INVENTION

In the technologies disclosed in Patent Literatures 1 and 2, delayed fracture is evaluated by applying a bending stress, a tensile stress, or the like to a specimen and subsequently immersing the specimen in an acidic solution for a predetermined amount of time in order to cause hydrogen to enter the steel sheet. In such a test, an evaluation is made after hydrogen is forced to enter the steel and, therefore, it is not possible to determine the impact of unwanted hydrogen that has been entered into the steel sheet in the production of the steel sheet. Accordingly, for determining the delayed fracture property of a coated steel sheet, it is necessary to determine delayed fracture resistance using a specimen on which a coating layer remains. In particular, automotive steel sheets are used after being subjected to working such as shearing. Since a shear plane may cause delayed fracture, it is necessary to determine the occurrence of delayed fracture at a shear plane.

An object according to aspects of the present invention is to provide a high-strength galvanized steel sheet that has excellent delayed fracture resistance by reducing the diffusible hydrogen content in the steel and to provide a method for producing the high-strength galvanized steel sheet.

The inventors of the present invention conducted extensive studies in order to address the above issues and, consequently, found that, for achieving excellent delayed fracture resistance, it is particularly necessary to reduce the diffusible hydrogen content in base steel which is movable at low temperatures of 200° C. or less. The inventors succeeded in reducing the diffusible hydrogen content in the steel by controlling the production conditions such as the hydrogen concentration in the furnace, composition, and microstructures and producing a high-strength galvanized steel sheet having excellent delayed fracture resistance. The inventors also found that narrowing the half-width of the hydrogen release peak reduces the amount of hydrogen concentrated at damaged parts of the steel sheet which are created as a result of shearing or the like and thereby improve delayed fracture resistance. The summary of aspects of the present invention is as follows.

[1] A high-strength galvanized steel sheet including a steel sheet having a composition containing, by mass, C: 0.10% or more and 0.5% or less, Si: 0.001% or more and less than 0.5%, Mn: 2.0% or more and 3.5% or less, P: 0.05% or less, S: 0.020% or less, Al: 0.01% or more and 1.0% or less, and N: 0.010% or less, and the balance being Fe and inevitable impurities, the steel sheet having a microstructure including martensite and tempered martensite, the total area fraction of the martensite and the tempered martensite being 30% or more; and a galvanizing layer formed on the surface of the steel sheet, wherein a diffusible hydrogen content in the high-strength galvanized steel sheet is 0.50 wt. ppm or less, a half-width of a hydrogen release peak is 70° C. or less, and the diffusible hydrogen content and the half-width of the hydrogen release peak are determined by the following analysis method.

(Analysis Method)

A strip-like steel sheet sample having a major axis of 30 mm and a minor axis of 5 mm is taken from the high-strength galvanized steel sheet at the center of the high-strength galvanized steel sheet in the width direction. After the steel sheet sample has been prepared, the galvanizing layer present on the surface of the steel sheet sample is completely removed with a handy router. Immediately after the removal of the galvanizing layer, a hydrogen analysis is conducted using a thermal desorption spectrometer with an analysis start temperature of 25° C., an analysis end temperature of 300° C., and a rate of temperature rise of 200° C./hour. The rate at which hydrogen is released from the surface of the steel sheet sample, that is, the hydrogen release rate (wt. ppm/min), is measured at each predetermined temperature. The half-width of the hydrogen release peak is calculated on the basis of the relationship between the hydrogen release rate and temperature. Furthermore, a total amount of hydrogen released while the temperature increases from the analysis start temperature to 200° C. is calculated as diffusible hydrogen content.

[2] The high-strength galvanized steel sheet described in [1], wherein the composition further contains one or two or more elements selected from, by mass, Nb: 0.001% or more and 0.10% or less, Ti: 0.001% or more and 0.10% or less, and V: 0.001% or more and 0.3% or less.

[3] The high-strength galvanized steel sheet described in [1] or [2], wherein the composition further contains one or two or more elements selected from, by mass, Mo: 0.001% or more and 1.0% or less, Cr: 0.001% or more and 1.0% or less, and B: 0.005% or less.

[4] The high-strength galvanized steel sheet described in any one of [1] to [3], wherein the composition further contains one or two elements selected from, by mass, Cu: 0.001% or more and 1.0% or less, and Ni: 0.001% or more and 1.0% or less.

[5] The high-strength galvanized steel sheet described in any one of [1] to [4], wherein the composition further contains one or two elements selected from, by mass, Sn: 0.2% or less, and Sb: 0.2% or less.

[6] The high-strength galvanized steel sheet described in any one of [1] to [5], wherein the composition further contains one or two or more elements selected from, by mass, Mg: 0.0001% or more and 0.01% or less, Ca: 0.0001% or more and 0.01% or less, Ce: 0.0001% or more and 0.01% or less, La: 0.0001% or more and 0.01% or less, and REM: 0.0001% or more and 0.01% or less.

[7] The high-strength galvanized steel sheet described in any one of [1] to [6], wherein the galvanizing layer is a hot-dip galvanizing (GI) layer, a hot-dip galvannealing (GA) layer, or an electrogalvanizing layer.

[8] A method for producing a high-strength galvanized steel sheet, the method including a hot-rolling step in which a slab having the composition described in any one of [1] to [6] is hot-rolled with a finishing temperature of 800° C. or more and 1000° C. or less and subsequently coiled at a coiling temperature of 700° C. or less; an annealing step in which the hot-rolled steel sheet prepared in the hot-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; a galvanizing step in which the annealed steel sheet prepared in the annealing step is subjected to a galvanizing treatment and subsequently cooled to room temperature; and a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

[9] A method for producing a high-strength galvanized steel sheet, the method including a hot-rolling step in which a slab having the composition described in any one of [1] to [6] is hot-rolled with a finishing temperature of 800° C. or more and 1000° C. or less and subsequently coiled at a coiling temperature of 700° C. or less; a cold-rolling step in which the hot-rolled steel sheet prepared in the hot-rolling step is pickled and subsequently cold-rolled; an annealing step in which the cold-rolled steel sheet prepared in the cold-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; a galvanizing step in which the annealed steel sheet prepared in the annealing step is subjected to a galvanizing treatment and subsequently cooled to room temperature; and a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

[10] A method for producing a high-strength galvanized steel sheet, the method including a hot-rolling step in which a slab having the composition described in any one of [1] to [6] is hot-rolled with a finishing temperature of 800° C. or more and 1000° C. or less and subsequently coiled at a coiling temperature of 700° C. or less; an annealing step in which the hot-rolled steel sheet prepared in the hot-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; and a galvanizing step in which the annealed steel sheet prepared in the annealing step is subjected to a galvanizing treatment and subsequently cooled to room temperature with an average cooling rate of 1° C./second or more and 20° C./second or less such that the amount of time during which the galvanized steel sheet is retained in the temperature range of 50° C. or more and 300° C. or less is 30 seconds or more.

[11] A method for producing a high-strength galvanized steel sheet, the method including a hot-rolling step in which a slab having the composition described in any one of [1] to [6] is hot-rolled with a finishing temperature of 800° C. or more and 1000° C. or less and subsequently coiled at a coiling temperature of 700° C. or less; a cold-rolling step in which the hot-rolled steel sheet prepared in the hot-rolling step is pickled and subsequently cold-rolled; an annealing step in which the cold-rolled steel sheet prepared in the cold-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; and a galvanizing step in which the annealed steel sheet prepared in the annealing step is subjected to a galvanizing treatment and subsequently cooled to room temperature with an average cooling rate of 1° C./second or more and 20° C./second or less such that the amount of time during which the galvanized steel sheet is retained in the temperature range of 50° C. or more and 300° C. or less is 30 seconds or more.

[12] The method for producing a high-strength galvanized steel sheet described in any one of [8] to [11], wherein the galvanizing treatment is a hot-dip galvanizing treatment or a hot-dip galvannealing treatment.

[13] A method for producing a high-strength galvanized steel sheet, the method including a hot-rolling step in which a slab having the composition described in any one of [1] to [6] is hot-rolled with a finishing temperature of 800° C. or more and 1000° C. or less and subsequently coiled at a coiling temperature of 700° C. or less; an annealing step in which the hot-rolled steel sheet prepared in the hot-rolling step is heated to the temperature range of $A_{C3}$ temperature—40° C. or more, then held for 10 seconds or more in a furnace having a hydrogen concentration of 2% by volume or more and less than 10% by volume, and subsequently cooled to room temperature with an average cooling rate of 1° C./second or more; and a galvanizing step in which the annealed steel sheet prepared in the annealing step is subjected to an electrogalvanizing treatment and, subsequent to the electrogalvanizing treatment, the electrogalvanized steel sheet is retained in the temperature range of 50° C. or more and 300° C. or less for 30 seconds or more, and subsequently cooled to room temperature.

[14] A method for producing a high-strength galvanized steel sheet, the method including a hot-rolling step in which a slab having the composition described in any one of [1] to [6] is hot-rolled with a finishing temperature of 800° C. or more and 1000° C. or less and subsequently coiled at a coiling temperature of 700° C. or less; a cold-rolling step in which the hot-rolled steel sheet prepared in the hot-rolling step is pickled and subsequently cold-rolled; an annealing step in which the cold-rolled steel sheet prepared in the cold-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; and a galvanizing step in which the annealed steel sheet prepared in the annealing step is subjected to an electrogalvanizing treatment and, subsequent to the electrogalvanizing treatment, the electrogalvanized steel sheet is retained in the temperature range of 50° C. or more and 300° C. or less for 30 seconds or more, and subsequently cooled to room temperature.

[15] A method for producing a high-strength galvanized steel sheet, the method including a hot-rolling step in which a slab having the composition described in any one of [1] to [6] is hot-rolled with a finishing temperature of 800° C. or more and 1000° C. or less and subsequently coiled at a coiling temperature of 700° C. or less; an annealing step in which the hot-rolled steel sheet prepared in the hot-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; a galvanizing step in which the annealed steel sheet prepared in the annealing step is subjected to an electrogalvanizing treatment and subsequently cooled to room temperature; and a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

[16] A method for producing a high-strength galvanized steel sheet, the method including a hot-rolling step in which a slab having the composition described in any one of [1] to [6] is hot-rolled with a finishing temperature of 800° C. or more and 1000° C. or less and subsequently coiled at a coiling temperature of 700° C. or less; a cold-rolling step in which the hot-rolled steel sheet prepared in the hot-rolling step is pickled and subsequently cold-rolled; an annealing step in which the cold-rolled steel sheet prepared in the cold-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; a galvanizing step in which the annealed steel sheet prepared in the annealing step is subjected to an electrogalvanizing treatment and subsequently cooled to room temperature; and a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

In accordance with aspects of the present invention, the content of diffusible hydrogen in the steel is reduced by adjusting the hydrogen concentration in the furnace and controlling composition, microstructures, and production conditions. Adjusting the composition and microstructures to be the specific composition and microstructures and limiting the diffusible hydrogen content to be 0.5 wt. ppm or less and the half-width of the hydrogen release peak to be 70° C. or less enables the production of a high-strength galvanized steel sheet having excellent delayed fracture resistance and a tensile strength of 980 MPa or more. Using the high-strength galvanized steel sheet according to aspects of the present invention as an automotive structural member enables increases in the strengths of automotive steel sheets and improvement of delayed fracture resistance to be both achieved. In other words, aspects of the present invention enhance the performance of car bodies.

BRIEF DESCRIPTION OF THE DRAWINGS

The FIGURE is a diagram illustrating an example of the hydrogen profile used for calculating the diffusible hydrogen content in the steel and the half-width of the hydrogen release peak.

DETAILED DESCRIPTION OF EMBODIMENTS OF THE INVENTION

An embodiment of the present invention is described below. The present invention is not limited by the following embodiment.

The high-strength galvanized steel sheet according to aspects of the present invention includes a steel sheet and a galvanizing layer formed on the steel sheet. First, the steel sheet is described in the order of composition and microstructures. Subsequently, the galvanizing layer is described. Finally, the properties of the high-strength galvanized steel sheet, that is, the diffusible hydrogen content and the half-width of the hydrogen release peak, are described. The method for producing the high-strength galvanized steel sheet according to aspects of the present invention is described after the description of the high-strength galvanized steel sheet.

C: 0.10% or More and 0.5% or Less

C needs to be added to the steel sheet in a certain amount because C significantly affects the strength of the steel sheet. Since C is an element that lowers the transformation temperature, addition of C lowers the temperature required for austenite annealing and is highly effective for limiting the formation of ferrite, which reduces tensile strength. If the C content is less than 0.10%, a tensile strength of 980 MPa or more fails to be achieved even when the production conditions are optimized. Therefore, the C content is limited to be 0.10% or more. The C content is preferably 0.12% or more, more preferably 0.14% or more, and further preferably 0.16% or more. Setting the C content to be more than 0.5% degrades weldability, which is necessary for automotive steel sheets, and delayed fracture resistance. Accordingly, the C content is limited to be 0.5% or less. The C content is preferably 0.4% or less, preferably 0.35% or less, and further preferably 0.30% or less.

Si: 0.001% or More and Less than 0.5%

Si is an element that suppresses the formation of carbide in the steel sheet, thereby increases strength, and enhances formability. In order to produce the above actions, the Si content is limited to be 0.001% or more. The Si content is preferably 0.010% or more, is more preferably 0.030% or more, and is further preferably 0.060% or more. Setting the Si content to be 0.5% or more increases the likelihood of Si oxides being formed on the surface of the steel sheet during annealing and degrades coatability. Accordingly, the Si content is limited to be less than 0.5%. The Si content is preferably 0.3% or less, more preferably 0.2% or less, and further preferably 0.15% or less.

Mn: 2.0% or More and 3.5% or Less

Mn is a solid-solution strengthening element and increases the tensile strength of the steel sheet. Furthermore, Mn enhances hardenability. Thus, addition of Mn reduces the likelihood of ferrite being formed while cooling is performed in an annealing treatment. If the Mn content is less than 2.0%, a large amount of ferrite is formed and a tensile strength of 980 MPa or more fails to be achieved. Accordingly, the Mn content is limited to be 2.0% or more. The Mn content is preferably 2.1% or more, more preferably 2.2% or more, and further preferably 2.3% or more. Setting the Mn content to be more than 3.5% increases the segregation of P at grain boundaries and degrades delayed fracture resistance. Accordingly, the Mn content is limited to be 3.5% or less. The Mn content is preferably 3.0% or less, more preferably 2.8% or less, and further preferably 2.6% or less.

P: 0.05% or Less

Normally, P is inevitably included in a steel sheet as an impurity element. P segregates at prior-austenite grain boundaries to cause embrittlement of grain boundaries and thereby increases the occurrence of cracking at the damaged parts of the steel sheet. Consequently, the concentrations of diffusible hydrogen at the edges of the cracks are increased and delayed fracture resistance becomes degraded accordingly. Therefore, it is advantageous to minimize the P content. The steel sheet does not necessarily include P (the P content may be 0%). In accordance with aspects of the present invention, the P content is limited to be 0.05% or less, preferably 0.03% or less, and more preferably 0.02% or less. With consideration of production costs, the P content is preferably 0.001% or more and is more preferably 0.005% or more.

S: 0.020% or Less

Normally, S is inevitably included in the steel sheet as an impurity element. S forms MnS inclusion particles in the steel. Coarsening of the MnS inclusion particles results in an increase in the concentrations of diffusible hydrogen at the interfaces between the iron base phase and the MnS inclusion particles, thereby degradation of delayed fracture resistance. Therefore, it is advantageous to minimize the S content. The steel sheet does not necessarily include S (the S content may be 0%). In accordance with aspects of the present invention, the S content is limited to be 0.020% or less, is preferably 0.010% or less, and is more preferably 0.008% or less. With consideration of production costs, the S content is preferably 0.0005% or more and is more preferably 0.001% or more.

Al: 0.01% or More and 1.0% or Less

Al is an element included in the steel sheet as a deoxidizing agent. In order to achieve the action, the Al content is limited to be 0.01% or more. The Al content is preferably 0.02% or more and is more preferably 0.03% or more. Setting the Al content to be more than 1.0% reduces the level of steel cleanliness and increases the amount and size of inclusion particles such as alumina particles. This results in an increase in the concentrations of diffusible hydrogen at the interfaces between the iron base phase and the inclusion particles such as alumina particles and degradation of delayed fracture resistance. Therefore, the Al content is limited to be 1.0% or less in order to achieve good delayed fracture resistance. The Al content is preferably 0.7% or less and more preferably 0.5% or less.

N: 0.010% or Less

An increase in the N content results in an increase in the amount of Al consumed as AlN, which reduces the advantageous effect achieved by the addition of Al. An increase in the N content also results in increases in the amount and size of AlN particles, which increases the concentrations of diffusible hydrogen at the interfaces between the iron base phase and the AlN particles and degrades delayed fracture resistance. Therefore, it is advantageous to minimize the N content. The steel sheet does not necessarily include N (the N content may be 0%). In accordance with aspects of the present invention, the N content is limited to be 0.010% or less, is preferably 0.007% or less, and is more preferably 0.005% or less. With consideration of production costs, the N content is preferably 0.0001% or more and is more preferably 0.001% or more.

The above composition may further contain the following optional elements such that the advantageous effects according to aspects of the present invention are not impaired.

Nb: 0.001% or More and 0.10% or Less, Ti: 0.001% or More and 0.10% or Less, and V: 0.001% or More and 0.3% or Less While the above elements increase tensile strength, they cause precipitation of fine carbide particles, which results in dispersion of hydrogen trapping sites, and thereby improve delayed fracture resistance. If the Nb, Ti, or V content is less than 0.001%, the above action fails to be achieved with effect. Setting the Nb, Ti, or V content to be higher than the predetermined upper limit causes coarsening of the carbide particles, which increases the concentrations of diffusible hydrogen at the interfaces between the iron base phase and the carbide particles and degrades delayed fracture resistance. The above elements may be used alone or in combination of two or more. The minimum Nb content is preferably 0.010% or more, more preferably 0.020% or more, and further preferably 0.025% or more. The minimum Ti content is preferably 0.010% or more, more preferably 0.015% or more, and further preferably 0.020% or more. The minimum V content is preferably 0.010% or more, and more preferably 0.020% or more. The maximum Nb content is preferably 0.080% or less, more preferably 0.070% or less, and further preferably 0.065% or less. The maximum Ti content is preferably 0.090% or less, more preferably 0.070% or less, and further preferably 0.065% or less. The maximum V content is preferably 0.060% or less, more preferably 0.040% or less, and further preferably 0.035% or less.

Mo: 0.001% or More and 1.0% or Less, Cr: 0.001% or More and 1.0% or Less, and B: 0.005% or Less The above elements enhance hardenability, suppress the formation of ferrite during annealing, and increase tensile strength. In order to produce the above actions, the Mo, Cr, or B content needs to be equal to or higher than the predetermined lower limit. Setting the Mo, Cr, or B content to be higher than the predetermined upper limit increases the amounts and sizes of precipitate particles and inclusion particles, which increases the concentrations of diffusible hydrogen at the interfaces between the iron base phase and the precipitate particles or the inclusion particles and degrades delayed fracture resistance. Therefore, the Mo, Cr, or B content needs to be equal to or lower than the predetermined upper limit. The minimum Mo content is preferably 0.05% or more, and more preferably 0.10% or more. The minimum Cr content is preferably 0.05% or more, and more preferably 0.10% or more. The minimum B content is preferably 0.0008% or more, and more preferably 0.0010% or more. The maximum Mo content is preferably 0.50% or less, and more preferably 0.40% or less. The maximum Cr content is preferably 0.70% or less, and more preferably 0.60% or less. The maximum B content is preferably 0.0030% or less, and more preferably 0.0020% or less. The above elements may be used alone or in combination of two or more.

Cu: 0.001% or More and 1.0% or Less, and Ni: 0.001% or More and 1.0% or Less

The above elements are capable of suppressing corrosion. The above elements concentrate at the surface of the steel sheet to reduce the entry of hydrogen and thereby reduce the occurrence of delayed fracture. In order to produce the above actions, the Cu or Ni content needs to be equal to or higher than the predetermined lower limit. Since the above advantageous effects stop increasing when the Cu or Ni content exceeds the predetermined upper limit, the Cu or Ni content is set to be equal to or lower than the predetermined upper limit in order to reduce cost. The minimum Cu content is preferably 0.01% or more, is more preferably 0.02% or more, and is further preferably 0.05% or more. The minimum Ni content is preferably 0.01% or more, more preferably 0.02% or more, and further preferably 0.05% or more. The maximum Cu content is preferably 0.80% or less, and more preferably 0.60% or less. The maximum Ni content is preferably 0.60% or less, and more preferably 0.40% or less.

Sn: 0.2% or Less, and Sb: 0.2% or Less

Sn and Sb are elements that reduce decarburization of the surface of the steel sheet which may be caused by nitridation or oxidation of the surface of the steel sheet. Sn and Sb, which reduce the decarburization, avoid a reduction in the amount of martensite formed in the surface of the steel sheet and a reduction in tensile strength. However, setting the Sn or Sb content to be higher than 0.2% results in coarsening of the inclusion particles, which increases the concentrations of diffusible hydrogen at the interfaces between the iron base phase and the inclusion particles and degrades delayed fracture resistance. Therefore, the Sn or Sb content is set to be equal to or lower than the predetermined upper limit. The minimum Sn content is 0.005% or more, and more preferably 0.010% or more. The minimum Sb content is preferably 0.005% or more, and more preferably 0.010% or more. The maximum Sn content is preferably 0.04% or less, and more preferably 0.02% or less. The maximum Sb content is preferably 0.05% or less, and more preferably 0.03% or less. The above elements may be used alone or in combination of two or more.

Mg: 0.0001% or More and 0.01% or Less, Ca: 0.0001% or More and 0.01% or Less, Ce: 0.0001% or More and 0.01% or Less, La: 0.0001% or More and 0.01% or Less, and REM: 0.0001% or More and 0.01% or Less The above elements reduce the sizes of inclusion particles and the concentrations of diffusible hydrogen included in the steel at the interfaces between the iron base phase and the inclusion particles and thereby enhance delayed fracture resistance. In order to produce the above actions, the Mg, Ca, Ce, La, or REM content needs to be 0.0001% or more. The Mg, Ca, Ce, La, or REM content is preferably 0.0005% or more and is more preferably 0.0010% or more. Setting the Mg, Ca, Ce, La, or REM content to be higher than 0.01% results in coarsening of the inclusion particles, which increases the concentrations of diffusible hydrogen at the interfaces between the iron base phase and the inclusion particles, thereby degrades delayed fracture resistance. The Mg, Ca, Ce, La, or REM content is preferably 0.005% or less, and more preferably 0.003% or less. The above elements may be used alone or in combination of two or more.

The balance, that is, constituents other than the above elements, includes Fe and inevitable impurities. Even when the above optional constituents are included in the steel sheet at contents less than the above lower limits, they do not impair the advantageous effects according to aspects of the present invention. Therefore, when the above optional constituents are included in the steel sheet in amounts less than the above lower limits, it is considered that the optional constituents are included in the steel sheet as inevitable impurities.

Subsequently, the microstructures of the steel sheet are described below.

Total Area Fraction of Martensite and Tempered Martensite: 30% or More

For increasing the tensile strength of the steel sheet, it is necessary that the microstructures constituting the steel sheet include martensite and tempered martensite. If the area fraction of martensite and tempered martensite to all of the microstructures constituting the steel sheet is less than 30%, it becomes difficult to achieve a tensile strength of 980 MPa or more. Accordingly, the total area fraction of martensite and tempered martensite is limited to be 30% or more and is preferably 40% or more. The proportions of tempered martensite and martensite may be controlled in accordance with the intended properties. The term "martensite" used herein refers to a hard microstructure produced from austenite at low temperatures (equal to or lower than the martensite transformation temperature). The term "tempered martensite" used herein refers to a microstructure produced by tempering performed upon reheating of martensite. The maximum total area fraction of martensite and tempered martensite is not limited; the total area fraction of martensite and tempered martensite is preferably 80% or less and is more preferably 70% or less. Each content of martensite and tempered martensite is not limited. The area fraction of martensite is commonly 20% or less. The area fraction of tempered martensite is commonly 30% or more. The maximum area fraction of tempered martensite is, for example, 44% or less, 35% or less, or less than 30%.

The other microstructures are not limited. The microstructures constituting the steel sheet may include ferrite, pearlite, and bainite in addition to martensite and tempered martensite. The term "ferrite" used herein refers to a microstructure that is produced by transformation from austenite which occurs at relatively high temperatures and is constituted by crystal grains having the BCC lattice. The term "pearlite" used herein refers to a lamellar microstructure constituted by ferrite and cementite. The term "bainite" used herein refers to a hard microstructure that is produced from austenite at relatively low temperatures (equal to or higher than the martensite transformation temperature) and is constituted by acicular or plate-like ferrite grains and fine carbide particles dispersed in the ferrite grains. The area fraction of ferrite is preferably 20% or less, more preferably 19% or less, and further preferably 10% or less in order to maintain required strength. The minimum area fraction of ferrite is not limited and commonly set to be 1% or more. The total area fraction of bainite and pearlite is preferably 70% or less and more preferably 60% or less. The minimum total area fraction of bainite and pearlite is not limited and commonly set to be 35% or more.

The galvanizing layer is described below.

The galvanizing layer is not limited. In accordance with aspects of the present invention, a hot-dip galvanizing layer, a hot-dip galvannealing layer, and an electrogalvanizing layer are preferable. The composition of the galvanizing layer is also not limited and may be a common composition. The galvanizing layer commonly has a composition containing Fe: 0% by mass or more and 20% by mass or less, Al: 0% by mass or more and 1.0% by mass or less, and one or two or more elements selected from Pb, Sb, Si, Sn, Mg, Mn, Ni, Cr, Co, Ca, Cu, Li, Ti, Be, Bi, and REM: 0% by mass or more and 3.5% by mass or less in total, with the balance being Zn and inevitable impurities. As described above, the elements other than Zn are optional and are not necessarily included in the galvanizing layer. Examples of a coating layer further containing an element other than Zn include a Zn—Ni electroplating layer, a hot-dip zinc-aluminum plating layer, and a hot-dip zinc-aluminum-magnesium plating layer.

The properties of the high-strength galvanized steel sheet, that is, the diffusible hydrogen content and the half-width of the hydrogen release peak, are described below.

Diffusible Hydrogen Content in Steel Sheet is 0.50 wt. Ppm or Less (including 0 wt. ppm)

The term "diffusible hydrogen content" used herein refers to the cumulative amount of hydrogen released from the steel sheet while the steel sheet from which the galvanizing layer has been removed is heated to 200° C. with a thermal desorption spectrometer at a rate of temperature rise of 200° C./hr and specifically to the diffusible hydrogen content determined by the method described in Examples below. If the diffusible hydrogen content in the steel exceeds 0.50 wt. ppm, the intended delayed fracture resistance fails to be achieved. Accordingly, the diffusible hydrogen content in the steel is limited to be 0.50 wt. ppm or less, preferably 0.45 wt. ppm or less, and more preferably 0.40 wt. ppm or less.

The minimum diffusible hydrogen content in the steel is not limited and commonly 0.01 wt. ppm or more, 0.05 wt. ppm or more, 0.10 wt. ppm or more, or 0.20 wt. ppm or more.

Half-Width of Hydrogen Release Peak is 70° C. or Less

The half-width of the hydrogen release peak is the difference between the maximum and minimum temperatures at half the hydrogen release peak that occurs when the steel sheet is heated and is, specifically, the half-width of the hydrogen release peak which is determined by the method described in Examples below. Even in the case where the diffusible hydrogen content in the steel is 0.50 wt. ppm or less, that is, low, when the above half-width is larger than 70° C., that is, wide, a large amount of diffusible hydrogen may diffuse at low temperatures, that is, at low energies, and the hydrogen concentrations at the damaged parts of the steel sheet, at which stress is concentrated, are likely to be increased consequently. This facilitates the propagation of cracks and degrades delayed fracture resistance. Accordingly, the half-width of the hydrogen release peak is limited to be 70° C. or less, preferably 65° C. or less, and more preferably 60° C. or less. The minimum half-width of the hydrogen release peak is not limited and commonly 10° C. or more or 20° C. or more.

The method for producing the high-strength galvanized steel sheet is described below. The method for producing the high-strength galvanized steel sheet includes a hot-rolling step, a cold-rolling step conducted as needed, an annealing step, a galvanizing step, and a reheating step conducted as needed. Each of the above steps is described below. The term "temperature" used hereinafter refers to the temperature of the surface of the steel sheet unless otherwise specified. The temperature of the surface of the steel sheet is measured using a radiation thermometer or the like.

The hot-rolling step is a step in which a slab having the above composition is hot-rolled with a finishing temperature (finish rolling temperature) of 800° C. or more and 1000° C. or less and coiled with a coiling temperature of 700° C. or less.

The slab to be used is preferably produced by continuous casting in order to prevent macrosegregation of the constituents. The slab may be produced by ingot casting method or thin-slab casting method.

The temperature of the slab subjected to hot rolling is preferably 1000° C. or more. If the temperature of the slab is less than 1000° C., it becomes difficult to maintain a predetermined temperature in finish rolling. A reduction in the temperature results in an increase in the rolling load. Furthermore, it becomes impossible to perform sufficient rolling to a predetermined thickness. Accordingly, the temperature of the slab is preferably 1000° C. or more.

Finishing Temperature: 800° C. or More and 1000° C. or Less

The finishing temperature (finish rolling temperature) is limited to be 800° C. or more and 1000° C. or less. If the finishing temperature is less than 800° C., the rolling load is high and a significant burden is placed on the rolling mill consequently. In addition, the qualities of the inside of the steel sheet may become degraded. Accordingly, the finishing temperature is limited to be 800° C. or more and is preferably 850° C. or more. The finishing temperature is limited to be 1000° C. or less in order not to make it difficult to perform cooling to the coiling temperature. The finishing temperature is preferably 950° C. or less.

Coiling Temperature: 700° C. or Less

The steel sheet that has been cooled subsequent to the rolling is coiled at 700° C. or less. If the coiling temperature exceeds 700° C., the decarburization of the surface of base iron may occur. In such a case, a difference in microstructure is made between the inside of the steel sheet and the surface of the steel sheet, which causes inconsistencies in alloy concentration. Accordingly, the coiling temperature is limited to be 700° C. or less and preferably 650° C. or less. The minimum coiling temperature is not limited but is preferably 450° C. or more in order to prevent degradation of cold rollability.

The cold-rolling step may optionally be conducted subsequent to the hot-rolling step. The cold-rolling step is a step in which the hot-rolled steel sheet prepared in the hot-rolling step is pickled and cold-rolled.

The conditions under which the pickling is performed are not limited. The reduction ratio with which the cold-rolling is performed is not limited. If the rolling reduction ratio is less than 20%, the degree of flatness of the surface of the steel sheet may be low and the consistency of the microstructures may become degraded. Therefore, the rolling reduction ratio is preferably set to be 20% or more. The maximum rolling reduction ratio is not limited; in accordance with aspects of the present invention, the rolling reduction ratio is commonly set to 70% or less. The cold-rolling step may be omitted when the microstructures and mechanical properties required in accordance with aspects of the present invention are satisfied.

The annealing step is conducted subsequent to the cold-rolling step or, in the case where the cold-rolling step is not conducted, subsequent to the hot-rolling step. The annealing step is a step in which the hot-rolled or cold-rolled steel sheet is heated to the temperature range of the $A_{C3}$ temperature—40° C. or more, then held in a furnace having a hydrogen concentration of 2% by volume or more and less than 10% by volume for 10 seconds or more, and subsequently cooled to 600° C. with an average cooling rate of 5° C./second or more.

Annealing Temperature: $A_{C3}$ Temperature—40° C. or More

If the annealing temperature is less than the $A_{C3}$ temperature—40° C., the ferrite content becomes excessively high, which makes it difficult to produce a steel sheet having a tensile strength of 980 MPa or more. Accordingly, the annealing temperature is limited to be the $A_{C3}$ temperature—40° C. or more and preferably the $A_{C3}$ temperature—20° C. or more. The maximum annealing temperature is not limited but is preferably 900° C. or less in order to suppress coarsening of austenite grains.

Hydrogen Concentration in Furnace: 2 Vol % or More and Less than 10 Vol %

If the hydrogen concentration in the furnace is less than 2% by volume, the reduction effect of hydrogen which is produced during annealing becomes degraded and, consequently, an oxide is formed on the surface of the steel sheet. This makes it difficult to form a galvanizing layer on the surface of the steel sheet. Accordingly, the hydrogen concentration in the furnace is limited to be 2% by volume or more and is preferably 5% by volume or more. However, if the hydrogen concentration in the furnace is 10% by volume or more, the diffusible hydrogen content exceeds 0.50 wt. ppm and delayed fracture resistance becomes degraded accordingly. Thus, the hydrogen concentration in the furnace is limited to be less than 10% by volume and is preferably less than 9% by volume.

Holding Time: 10 Seconds or More

The amount of time during which holding is performed at the annealing temperature is limited to be 10 seconds or more. If the holding time is less than 10 seconds, dissolution of carbide and austenite transformation are not performed to sufficient degrees. This increases the likelihood of ferrite remaining in the microstructures and makes it difficult to achieve a tensile strength of 980 MPa or more. Therefore, the amount of time during which holding is performed at the annealing temperature is limited to be 10 seconds or more and is preferably 20 seconds or more. The maximum holding time at the annealing temperature is not limited. The holding time at the annealing temperature is preferably 1200 seconds or less, more preferably 300 seconds or less, and further preferably 100 seconds or less in order to suppress coarsening of austenite grains.

Subsequent to the holding at the annealing temperature, cooling is performed to a cooling-stop temperature of 600° C. or less with an average cooling rate of 5° C./second or more. If the average cooling rate is less than 5° C./second, ferrite and bainite are likely to be formed and the fraction of martensite is reduced accordingly. This results in a reduction in tensile strength. Therefore, the average cooling rate is limited to be 5° C./second or more and preferably 10° C./second or more. The average cooling rate is the average rate with which cooling is performed to 100° C. (when the cooling-stop temperature is higher than 100° C., the average rate with which cooling is performed to the cooling-stop temperature). In the case where holding is performed at a predetermined temperature in the cooling, the average cooling rate is the average rate with which cooling is performed until the holding starts. The maximum average cooling rate is not limited; the average cooling rate is preferably 70° C./second or less and more preferably 40° C./second or less.

The cooling-stop temperature is limited to be 600° C. or less because, if the cooling-stop temperature is higher than 600° C., delayed fracture resistance becomes degraded. The cooling-stop temperature is preferably 550° C. or less. The minimum cooling-stop temperature is not limited; in accordance with aspects of the present invention, the cooling-stop temperature is commonly set to 100° C. or more.

Holding may be performed in the cooling at a predetermined temperature of 600° C. or less. The holding enables pearlite and bainite to be formed for adjusting strength. If the holding temperature is higher than 600° C., the growth of cementite and bainite transformation occurs during holding. Since a larger amount of coarse carbide particles are formed in bainite than in martensite or tempered martensite, the amount of coarse carbide particles included in the final microstructures increases with the progress of bainite transformation. Consequently, the concentrations of diffusible hydrogen at the interfaces between the iron base phase and the carbide particles are increased, and delayed fracture resistance becomes degraded. Therefore, the holding temperature is preferably 600° C. or less. The amount of time during which the holding is performed is not limited. If the holding time is more than 1200 seconds, an excessive amount of bainite is formed and the area fraction of bainite to all of the microstructures constituting the steel sheet exceeds 70%. In such a case, it becomes difficult to achieve a tensile strength of 980 MPa or more. Therefore, the holding time is preferably 1200 seconds or less, more preferably 300 seconds or less, and further preferably 100 seconds or less.

The galvanizing step follows the annealing step. The galvanizing step differs according to whether the reheating step is performed after the galvanizing step or not. First, the case where the galvanizing step is conducted and the reheating step is subsequently conducted is described. In the case where electrogalvanizing is performed, the galvanizing step is conducted under different conditions, which are described at the end of the description of the galvanizing step.

The galvanizing step preceding the reheating step is a step in which the annealed steel sheet produced in the annealing step is subjected to a galvanizing treatment and subsequently cooled to room temperature.

Examples of the type of the galvanizing treatment include, but are not limited to, a hot-dip galvanizing treatment and a hot-dip galvannealing treatment. In the case where the galvanizing treatment is a hot-dip galvanizing treatment, the molten Al content is commonly 0.12% to 0.22% by mass. In the case where the galvanizing treatment is a hot-dip galvannealing treatment, the molten Al content is commonly 0.08% to 0.18% by mass. The galvanizing treatment is commonly performed by dipping the annealed steel sheet into a galvanizing bath having a temperature of 440° C. to 500° C. The amount of galvanizing layer deposited on the steel sheet is adjusted by gas wiping or the like. The hot-dip galvannealing treatment is performed by, for example, after the amount of galvanizing layer deposited on the steel sheet has been adjusted, heating the galvanized steel sheet to 450° C. to 600° C. and performing holding for 1 to 30 seconds.

The rate at which cooling is performed to room temperature subsequent to the galvanizing treatment is not limited. The term "room temperature" used herein refers to a temperature of 0° C. to 50° C.

The reheating step following the galvanizing step is a step in which the coated steel sheet produced in the galvanizing step is reheated at a heating temperature of 50° C. or more and 300° C. or less such that the amount of time during which the coated steel sheet is retained in the temperature range of 50° C. or more and 300° C. or less is 30 seconds or more and, subsequent to the reheating, cooling is performed to room temperature.

The heating temperature is limited to be 50° C. or more and 300° C. or less. Reheating the galvanized steel sheet at such a heating temperature reduces the diffusible hydrogen content in the steel sheet. Reducing the content of diffusible hydrogen of low-temperature range, which is particularly likely to diffuse, narrows the half-width of the hydrogen release peak and enhances delayed fracture resistance. If the heating temperature is less than 50° C., the above advantageous effects are not achieved because the amount of diffusible hydrogen that becomes movable at a temperature of less than 50° C. is small. If the heating temperature is more than 300° C., softening of martensite occurs, which reduces strength. Therefore, the heating temperature is limited to be 50° C. or more and 300° C. or less and is preferably 60° C. or more and 280° C. or less.

The amount of time during which the coated steel sheet is retained in the reheating step is limited to be 30 seconds or more. If the retention time in the reheating step is less than 30 seconds, the amount of time during which hydrogen is diffused is small and not enough to reduce the amount of diffusible hydrogen included in the steel. Therefore, the retention time in the reheating step is limited to be 30 seconds or more and is preferably 40 seconds or more. The maximum retention time in the reheating step is not limited; the retention time is preferably set to 3 days or less in order to enhance productivity and limit a reduction in strength caused as a result of coarsening of carbide particles.

The galvanizing step conducted in the case where the reheating step is not conducted is described below. The galvanizing step conducted in the case where the reheating step is not conducted is a step in which the annealed steel sheet produced in the annealing step is subjected to a galvanizing treatment and subsequently cooled to room temperature with an average cooling rate of 1° C./second or more and 20° C./second or less such that the amount of time during which the galvanized steel sheet is retained in the temperature range of 50° C. or more and 300° C. or less is 30 seconds or more.

The description of the galvanizing treatment is omitted since the galvanizing treatment can be performed in the same manner as the galvanizing treatment performed in the case where the reheating step is conducted.

If the average cooling rate is less than 1° C./second, formation and growth of bainite and growth of carbide occur, which results in formation of an excessive amount of bainite and a reduction in strength. Furthermore, the amount of coarse carbide particles included in the final microstructures is increased. This increases the concentrations of diffusible hydrogen at the interfaces between the iron base phase and the carbide particles and degrades delayed fracture resistance. Therefore, the average cooling rate is limited to be 1° C./second or more. The average cooling rate needs to be 20° C./second or less in order to provide enough time to release the diffusible hydrogen into the air.

The description of the condition "the amount of time during which the galvanized steel sheet is retained in the temperature range of 50° C. or more and 300° C. or less is 30 seconds or more" is omitted since the above condition has the same technical meanings as the temperature and the retention time specified in the reheating step.

The galvanizing step conducted in the case where electrogalvanizing is performed is described below. The galvanizing step conducted in a production method in which electrogalvanizing is performed and the reheating step is not conducted is a step in which the annealed steel sheet produced in the annealing step is subjected to an electrogalvanizing treatment and, subsequent to the electrogalvanizing treatment, the galvanized steel sheet is retained in the temperature range of 50° C. or more and 300° C. or less for 30 seconds or more and subsequently cooled to room temperature.

In the electrogalvanizing treatment, for example, the Fe concentration in an Fe—Zn alloy layer can be changed by adjusting the current density within the range of 10 to 80 $A/dm^2$, and the amount of the Fe—Zn alloy layer deposited on the steel sheet can be changed by adjusting the amount of time during which the electrolysis is performed.

The description of the conditions "retained in the temperature range of 50° C. or more and 300° C. or less for 30 seconds or more" is omitted since the above condition has the same technical meanings as the temperature range and the retention time specified in the above reheating step conducted in the case where a galvanizing treatment other than the electrogalvanizing treatment is performed.

The galvanizing step conducted in a production method in which electrogalvanizing is performed and the reheating step is conducted is a step in which the annealed steel sheet produced in the annealing step is subjected to an electrogalvanizing treatment and subsequently cooled to room temperature. The description of the electrogalvanizing treatment is omitted since the electrogalvanizing treatment is the same as in the case where the reheating step is not conducted. The term "room temperature" used herein refers to a temperature of 0° C. to 50° C.

The reheating step conducted in a production method in which electrogalvanizing is performed is a step in which the galvanized steel sheet produced in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooling is performed to room temperature.

The temperature and the retention time specified in the reheating step have the same technical meanings as those specified in the other reheating step conducted in a production method in which galvanizing treatment other than electrogalvanizing is performed. Therefore, the description thereof is omitted.

EXAMPLES

Production of Evaluation Steel Sheets

Steel samples having the compositions described in Table 1 with the balance being Fe and inevitable impurities were prepared in a vacuum melting furnace and subsequently subjected to slabbing. Hereby, steel slabs having a thickness of 27 mm were prepared. The steel slabs were hot-rolled to a thickness of 4.0 to 2.8 mm. The hot rolling was performed with a slab-heating temperature of 1000° C. to 1250° C. under the conditions described in Table 2. In examples in which cold rolling was to be performed, the hot-rolled steel sheets were ground to a thickness of 3.2 mm and subsequently cold-rolled to a thickness of 2.5 to 1.4 mm to form cold-rolled steel sheets. The hot-rolled steel sheets and the cold-rolled steel sheets were subjected to a heat treatment under the conditions described in Table 2. Hereby, galvanized steel sheets were produced.

Hot-dip galvannealed steel sheets were produced with an alloying temperature of 550° C. Electrogalvanized steel sheets were produced using an electrogalvanizing solution having a divalent iron ion concentration of 150 g/L and a divalent zinc ion concentration of 40 g/L, which served as sulfates, the pH of the electrogalvanizing solution being adjusted to be 2.0 using sulfuric acid.

The amount of the hot-dip galvanizing layer, the hot-dip galvannealing layer, or the electrogalvanizing layer formed on each of the steel sheets was 35 g/m$^2$ or more and 50 g/m$^2$ or less per side of the steel sheet.

TABLE 1

| Steel type | Chemical composition (mass %) | | | | | | | | | | | |
|---|---|---|---|---|---|---|---|---|---|---|---|---|
| | C | Si | Mn | P | S | Al | N | Nb | Ti | V | Cr | Mo |
| A | 0.14 | 0.10 | 2.4 | 0.010 | 0.002 | 0.045 | 0.004 | | | | | |
| B | 0.18 | 0.25 | 2.3 | 0.005 | 0.006 | 0.026 | 0.003 | | | | | |
| C | 0.11 | 0.40 | 2.8 | 0.018 | 0.003 | 0.038 | 0.004 | | | | | |
| D | 0.42 | 0.15 | 2.2 | 0.008 | 0.003 | 0.035 | 0.005 | | | | | |
| E | 0.17 | 0.02 | 2.6 | 0.007 | 0.004 | 0.048 | 0.003 | | | | | |
| F | 0.12 | 0.13 | 3.1 | 0.009 | 0.002 | 0.043 | 0.006 | | | | | |
| G | 0.22 | 0.10 | 2.4 | 0.012 | 0.002 | 0.039 | 0.003 | 0.016 | | | | |
| H | 0.14 | 0.02 | 2.5 | 0.010 | 0.004 | 0.040 | 0.004 | | 0.014 | | | |
| I | 0.43 | 0.12 | 2.6 | 0.016 | 0.003 | 0.038 | 0.003 | 0.031 | | | | |
| J | 0.13 | 0.07 | 3.2 | 0.012 | 0.001 | 0.027 | 0.005 | | 0.016 | | | |
| K | 0.42 | 0.10 | 2.4 | 0.012 | 0.001 | 0.029 | 0.004 | 0.027 | 0.021 | | | |
| L | 0.12 | 0.01 | 3.1 | 0.024 | 0.002 | 0.043 | 0.004 | 0.041 | 0.033 | | | 0.10 |
| M | 0.23 | 0.07 | 2.2 | 0.019 | 0.007 | 0.036 | 0.003 | 0.074 | | | | |
| N | 0.16 | 0.12 | 2.3 | 0.023 | 0.008 | 0.034 | 0.002 | | 0.081 | | | |
| O | 0.18 | 0.30 | 2.4 | 0.020 | 0.018 | 0.034 | 0.003 | 0.060 | 0.060 | 0.025 | | |
| P | 0.32 | 0.09 | 2.2 | 0.018 | 0.008 | 0.048 | 0.004 | 0.020 | 0.028 | 0.034 | | |
| Q | 0.14 | 0.13 | 2.7 | 0.016 | 0.002 | 0.035 | 0.003 | | | | 0.18 | 0.12 |
| R | 0.20 | 0.11 | 2.5 | 0.018 | 0.003 | 0.6 | 0.003 | | | | 0.58 | 0.31 |
| S | 0.25 | 0.10 | 2.2 | 0.014 | 0.004 | 0.041 | 0.010 | 0.034 | 0.017 | | 0.15 | 0.12 |
| T | 0.36 | 0.04 | 2.5 | 0.008 | 0.003 | 0.035 | 0.003 | | | | | |
| U | 0.48 | 0.20 | 2.5 | 0.006 | 0.002 | 0.036 | 0.006 | | | | | |
| V | 0.08 | 0.06 | 2.6 | 0.011 | 0.002 | 0.046 | 0.004 | | | | | |
| W | 0.07 | 0.12 | 2.7 | 0.014 | 0.004 | 0.033 | 0.003 | 0.036 | 0.025 | 0.014 | | |
| X | 0.60 | 0.10 | 2.4 | 0.019 | 0.004 | 0.041 | 0.003 | | | | | |
| Y | 0.56 | 0.17 | 2.2 | 0.008 | 0.003 | 0.038 | 0.004 | 0.031 | 0.027 | | | |
| Z | 0.21 | 0.70 | 2.2 | 0.007 | 0.003 | 0.025 | 0.003 | | | | | |
| AA | 0.14 | 0.65 | 2.6 | 0.012 | 0.004 | 0.031 | 0.003 | | 0.042 | | | |
| AB | 0.14 | 0.01 | 1.7 | 0.009 | 0.004 | 0.029 | 0.004 | | | | | |
| AC | 0.22 | 0.04 | 1.8 | 0.012 | 0.003 | 0.033 | 0.004 | 0.024 | 0.033 | | | |
| AD | 0.14 | 0.02 | 3.9 | 0.010 | 0.002 | 0.037 | 0.005 | | | | | |
| AE | 0.21 | 0.09 | 3.7 | 0.007 | 0.004 | 0.027 | 0.003 | 0.029 | 0.024 | 0.012 | | |
| AF | 0.16 | 0.02 | 2.8 | 0.070 | 0.003 | 0.046 | 0.004 | | | | | |
| AG | 0.22 | 0.06 | 2.2 | 0.072 | 0.004 | 0.036 | 0.004 | 0.015 | | | | |
| AH | 0.18 | 0.10 | 2.4 | 0.007 | 0.025 | 0.047 | 0.003 | | | | | |
| AI | 0.16 | 0.07 | 2.6 | 0.008 | 0.023 | 0.033 | 0.004 | 0.026 | 0.031 | | | |
| AJ | 0.25 | 0.01 | 2.4 | 0.010 | 0.002 | 1.5 | 0.003 | | | | | |
| AK | 0.21 | 0.05 | 2.2 | 0.006 | 0.004 | 1.3 | 0.003 | 0.033 | 0.026 | 0.021 | | |
| AL | 0.18 | 0.01 | 2.2 | 0.012 | 0.002 | 0.041 | 0.015 | | | | | |
| AM | 0.15 | 0.04 | 2.4 | 0.006 | 0.003 | 0.035 | 0.013 | | 0.019 | | | |
| AN | 0.14 | 0.15 | 2.7 | 0.019 | 0.013 | 0.031 | 0.003 | 0.120 | 0.025 | | | |
| AO | 0.16 | 0.06 | 2.2 | 0.012 | 0.007 | 0.042 | 0.003 | 0.022 | 0.120 | | | |

| Steel type | Chemical composition (mass %) | | | | | | | | | | $A_{C3}$ temperature (° C.) |
|---|---|---|---|---|---|---|---|---|---|---|---|
| | Cu | Ni | B | Sn | Sb | Mg | Ca | Ce | La | REM | |
| A | | | | | | | | | | | 787 |
| B | | | | | | | | | | | 778 |

TABLE 1-continued

| | | | | | | | | | | |
|---|---|---|---|---|---|---|---|---|---|---|
| C | | | | | | | | | | 794 |
| D | | | | | | | | | | 735 |
| E | | | | | | | | | | 771 |
| F | | | | | | | | | | 772 |
| G | | | | | | | | | | 765 |
| H | | | | | | | | | | 784 |
| I | | | | | | | | | | 722 |
| J | | | | | | | | | | 763 |
| K | | | | | | | | | | 733 |
| L | | | 0.001 | | | | | | | 783 |
| M | | | | | | | | | | 766 |
| N | | | | | | | | | | 813 |
| O | | | | 0.001 | | | | | | 807 |
| P | | | | 0.003 | | | | | | 771 |
| Q | 0.25 | 0.38 | | 0.002 | | | | | | 860 |
| R | 0.46 | | | | | | | | | 900 |
| S | 0.11 | 0.10 | | 0.002 | | | | | | 774 |
| T | | | | | 0.015 | 0.022 | | | | 733 |
| U | | | | | | | 0.001 | 0.002 | 0.001 0.001 0.001 | 721 |
| V | | | | | | | | | | 798 |
| W | | | | | | | | | | 807 |
| X | | | | | | | | | | 704 |
| Y | | | | | | | | | | 728 |
| Z | | | | | | | | | | 794 |
| AA | | | | | | | | | | 816 |
| AB | | | | | | | | | | 797 |
| AC | | | | | | | | | | 791 |
| AD | | | | | | | | | | 735 |
| AE | | | | | | | | | | 733 |
| AF | | | | | | | | | | 767 |
| AG | | | | | | | | | | 768 |
| AH | | | | | | | | | | 778 |
| AI | | | | | | | | | | 782 |
| AJ | | | | | | | | | | 950 |
| AK | | | | | | | | | | 900 |
| AL | | | | | | | | | | 778 |
| AM | | | | | | | | | | 785 |
| AN | | | | | | | | | | 784 |
| AO | | | | | | | | | | 833 |

TABLE 2

| | | Hot rolling | | | Cold rolling | Production conditions | | | | |
|---|---|---|---|---|---|---|---|---|---|---|
| No. | Steel type | Slab-heating temperature ° C. | Finishing temperature ° C. | Coiling temperature ° C. | Rolling reduction % | Annealing temperature ° C. | Annealing holding time second | Hydrogen concentration in furnace volume % | Cooling rate ° C./second | Cooling-stop temperature ° C. |
| 1 | A | 1250 | 880 | 600 | — | 840 | 17 | 4 | 20 | 470 |
| 2 | | 1250 | 880 | 600 | 56 | 900 | 17 | 7 | 18 | 470 |
| 3 | | 1250 | 880 | 600 | 56 | 740 | 17 | 9 | 23 | 470 |
| 4 | | 1250 | 880 | 600 | 56 | 840 | 17 | 12 | 23 | 470 |
| 5 | | 1250 | 880 | 600 | 56 | 840 | 17 | 4 | 20 | 470 |
| 6 | | 1250 | 880 | 600 | 56 | 840 | 17 | 4 | 18 | 470 |
| 7 | | 1250 | 880 | 600 | 56 | 840 | 17 | 3 | 23 | 470 |
| 8 | | 1250 | 880 | 600 | 56 | 840 | 17 | 3 | 23 | 470 |
| 9 | B | 1250 | 880 | 600 | — | 840 | 17 | 5 | 23 | 470 |
| 10 | | 1250 | 880 | 600 | 56 | 840 | 17 | 5 | 23 | 470 |
| 11 | | 1250 | 880 | 600 | 56 | 840 | 17 | 5 | 23 | 470 |
| 12 | | 1250 | 880 | 600 | 56 | 840 | 17 | 5 | 23 | 470 |
| 13 | | 1250 | 880 | 600 | 56 | 840 | 17 | 5 | 23 | 470 |
| 14 | | 1250 | 880 | 600 | 56 | 840 | 17 | 5 | 18 | 470 |
| 15 | | 1250 | 880 | 600 | 56 | 840 | 17 | 5 | 18 | 470 |
| 16 | | 1250 | 880 | 600 | 56 | 840 | 17 | 5 | 18 | 470 |
| 17 | C | 1250 | 880 | 600 | 56 | 840 | 17 | 6 | 18 | 470 |
| 18 | | 1250 | 880 | 600 | 56 | 840 | 17 | 6 | 18 | 470 |
| 19 | | 1250 | 880 | 600 | 56 | 840 | 17 | 6 | 18 | 470 |
| 20 | D | 1250 | 880 | 600 | 56 | 840 | 17 | 6 | 18 | 470 |
| 21 | | 1250 | 880 | 600 | 56 | 840 | 17 | 6 | 18 | 470 |
| 22 | | 1250 | 880 | 600 | 56 | 840 | 17 | 6 | 18 | 470 |
| 23 | E | 1250 | 880 | 600 | 56 | 840 | 17 | 5 | 20 | 470 |
| 24 | | 1250 | 880 | 600 | 56 | 840 | 17 | 5 | 20 | 470 |
| 25 | | 1250 | 880 | 600 | — | 840 | 17 | 5 | 20 | 470 |
| 26 | F | 1250 | 880 | 600 | 56 | 710 | 17 | 5 | 18 | 470 |
| 27 | | 1000 | 880 | 600 | — | 780 | 17 | 7 | 20 | 470 |
| 28 | | 1100 | 880 | 600 | 56 | 830 | 17 | 9 | 23 | 470 |

TABLE 2-continued

| | | | | | | | | | | |
|---|---|---|---|---|---|---|---|---|---|---|
| 29 | G | 1250 | 880 | 600 | 56 | 840 | 17 | 5 | 18 | 470 |
| 30 | | 1250 | 880 | 600 | 56 | 840 | 17 | 5 | 18 | 470 |
| 31 | | 1250 | 880 | 600 | — | 840 | 17 | 5 | 18 | 470 |
| 32 | H | 1250 | 880 | 600 | 56 | 840 | 17 | 5 | 18 | 470 |
| 33 | | 1250 | 880 | 600 | 56 | 840 | 17 | 5 | 18 | 470 |
| 34 | | 1250 | 880 | 600 | 56 | 840 | 17 | 5 | 18 | 470 |
| 35 | I | 1250 | 880 | 600 | — | 820 | 17 | 2 | 18 | 470 |
| 36 | | 1250 | 880 | 600 | 56 | 840 | 17 | 2 | 18 | 470 |
| 37 | | 1250 | 880 | 600 | 56 | 860 | 17 | 6 | 18 | 470 |
| 38 | | 1250 | 880 | 600 | 56 | 900 | 17 | 5 | 18 | 470 |
| 39 | J | 1250 | 880 | 600 | 56 | 860 | 17 | 4 | 18 | 470 |
| 40 | | 1250 | 880 | 600 | 56 | 840 | 17 | 7 | 18 | 470 |
| 41 | | 1250 | 880 | 600 | 56 | 840 | 17 | 6 | 18 | 470 |
| 42 | | 1250 | 880 | 600 | 56 | 840 | 17 | 5 | 18 | 470 |
| 43 | K | 1250 | 880 | 600 | 56 | 840 | 17 | 5 | 18 | 470 |
| 44 | | 1250 | 880 | 600 | 56 | 840 | 17 | 6 | 18 | 470 |
| 45 | | 1250 | 880 | 600 | 56 | 840 | 17 | 4 | 18 | 470 |
| 46 | | 1250 | 880 | 600 | 56 | 840 | 17 | 4 | 18 | 470 |
| 47 | L | 1250 | 880 | 600 | 56 | 740 | 17 | 6 | 18 | 470 |
| 48 | | 1250 | 880 | 600 | 56 | 780 | 17 | 3 | 20 | 470 |
| 49 | | 1250 | 880 | 600 | 56 | 830 | 17 | 9 | 23 | 470 |
| 50 | M | 1250 | 880 | 600 | — | 840 | 17 | 3 | 23 | 470 |
| 51 | | 1250 | 880 | 600 | 56 | 840 | 17 | 5 | 23 | 470 |
| 52 | | 1250 | 880 | 600 | 56 | 840 | 17 | 7 | 23 | 470 |
| 53 | | 1250 | 880 | 600 | 56 | 840 | 17 | 4 | 23 | 470 |
| 54 | N | 1250 | 880 | 600 | 56 | 760 | 17 | 5 | 23 | 470 |
| 55 | | 1250 | 880 | 600 | 56 | 800 | 17 | 6 | 23 | 470 |
| 56 | | 1250 | 880 | 600 | 56 | 840 | 17 | 7 | 23 | 470 |
| 57 | | 1250 | 880 | 600 | 56 | 880 | 17 | 4 | 23 | 470 |
| 58 | O | 1250 | 880 | 600 | 56 | 840 | 17 | 8 | 23 | 470 |
| 59 | | 1250 | 880 | 600 | 56 | 840 | 17 | 7 | 23 | 470 |
| 60 | | 1250 | 880 | 700 | 56 | 840 | 17 | 7 | 23 | 470 |
| 61 | | 1000 | 880 | 700 | 56 | 840 | 17 | 9 | 23 | 470 |
| 62 | | 1100 | 880 | 600 | 56 | 840 | 17 | 15 | 23 | 470 |
| 63 | P | 1250 | 800 | 600 | 56 | 720 | 17 | 6 | 18 | 470 |
| 64 | | 1250 | 800 | 600 | 56 | 780 | 17 | 7 | 20 | 470 |
| 65 | | 1250 | 800 | 600 | 56 | 830 | 17 | 9 | 10 | 470 |
| 66 | Q | 1250 | 880 | 700 | 56 | 840 | 17 | 4 | 18 | 470 |
| 67 | | 1250 | 880 | 600 | 56 | 840 | 17 | 7 | 20 | 470 |
| 68 | | 1250 | 880 | 600 | 56 | 840 | 12 | 9 | 20 | 470 |
| 69 | | 1250 | 880 | 600 | 56 | 840 | 30 | 7 | 20 | 470 |
| 70 | | 1250 | 880 | 600 | 56 | 840 | 50 | 6 | 20 | 470 |
| 71 | | 1250 | 880 | 600 | 56 | 840 | 17 | 8 | 23 | 600 |
| 72 | R | 1250 | 880 | 600 | 56 | 880 | 5 | 5 | 18 | 470 |
| 73 | | 1250 | 880 | 600 | 56 | 880 | 17 | 7 | 1 | 470 |
| 74 | | 1250 | 880 | 600 | 56 | 880 | 17 | 9 | 18 | 200 |
| 75 | | 1250 | 880 | 600 | 56 | 880 | 17 | 8 | 18 | 350 |
| 76 | | 1250 | 880 | 600 | 56 | 880 | 17 | 6 | 18 | 500 |
| 77 | | 1250 | 880 | 600 | 56 | 880 | 7 | 18 | 650 | 63 |
| 78 | S | 1250 | 800 | 600 | 20 | 840 | 17 | 9 | 18 | 470 |
| 79 | | 1250 | 900 | 600 | 30 | 840 | 17 | 8 | 20 | 470 |
| 80 | | 1250 | 1000 | 600 | 56 | 840 | 17 | 6 | 23 | 470 |
| 81 | T | 1250 | 880 | 600 | 56 | 840 | 17 | 5 | 18 | 470 |
| 82 | | 1250 | 880 | 600 | 56 | 840 | 17 | 4 | 20 | 470 |
| 83 | | 1250 | 880 | 600 | 56 | 840 | 17 | 9 | 23 | 470 |
| 84 | U | 1250 | 880 | 600 | 56 | 660 | 17 | 5 | 18 | 470 |
| 85 | | 1250 | 880 | 600 | 56 | 740 | 17 | 8 | 20 | 470 |
| 86 | | 1250 | 880 | 600 | 56 | 830 | 17 | 6 | 23 | 470 |
| 87 | V | 1250 | 880 | 600 | 56 | 700 | 17 | 7 | 18 | 470 |
| 88 | | 1250 | 880 | 600 | 56 | 780 | 17 | 9 | 20 | 470 |
| 89 | | 1250 | 880 | 600 | 56 | 830 | 17 | 5 | 23 | 470 |
| 90 | W | 1250 | 880 | 600 | 56 | 840 | 17 | 3 | 23 | 470 |
| 91 | X | 1250 | 870 | 600 | 56 | 840 | 17 | 6 | 23 | 470 |
| 92 | Y | 1250 | 880 | 600 | 56 | 840 | 17 | 4 | 23 | 470 |
| 93 | Z | 1250 | 880 | 600 | 56 | 840 | 17 | 3 | 23 | 470 |
| 94 | AA | 1250 | 880 | 600 | 56 | 840 | 17 | 4 | 23 | 470 |
| 95 | AB | 1250 | 880 | 600 | 56 | 840 | 17 | 5 | 23 | 470 |
| 96 | AC | 1250 | 880 | 600 | 56 | 840 | 17 | 3 | 23 | 470 |
| 97 | AD | 1250 | 880 | 600 | 56 | 840 | 17 | 5 | 23 | 470 |
| 98 | AE | 1250 | 880 | 600 | 56 | 840 | 17 | 4 | 23 | 470 |
| 99 | AF | 1250 | 880 | 600 | 56 | 840 | 17 | 5 | 23 | 470 |
| 100 | AG | 1250 | 880 | 600 | 56 | 840 | 17 | 3 | 23 | 470 |
| 101 | AH | 1250 | 880 | 600 | 56 | 840 | 17 | 8 | 23 | 470 |
| 102 | AI | 1250 | 880 | 600 | 56 | 840 | 17 | 4 | 23 | 470 |
| 103 | AJ | 1250 | 880 | 600 | 56 | 920 | 17 | 7 | 23 | 470 |
| 104 | AK | 1250 | 880 | 600 | 56 | 880 | 17 | 5 | 23 | 470 |
| 105 | AL | 1250 | 880 | 600 | 56 | 840 | 17 | 9 | 23 | 470 |
| 106 | AM | 1250 | 880 | 600 | 56 | 840 | 17 | 3 | 23 | 470 |

TABLE 2-continued

| | | | | | | | | | | |
|---|---|---|---|---|---|---|---|---|---|---|
| 107 | AN | 1250 | 880 | 600 | 56 | 840 | 17 | 4 | 23 | 470 |
| 108 | AO | 1250 | 880 | 600 | 56 | 840 | 17 | 6 | 23 | 470 |
| 109 | | 1250 | 880 | 600 | 56 | 840 | 17 | 1 | 23 | 470 |

| | | Production conditions | | | | | | |
|---|---|---|---|---|---|---|---|---|
| No. | Steel type | Holding time second | Post-galvanizing cooling rate ° C./second | Retention time at 300° C. to 50° C. second | Galvanizing treatment | Reheating temperature ° C. | Reheating time second | |
| 1 | A | 63 | 8 | 50 | GA | — | — | Invention example |
| 2 | | 63 | 8 | 50 | GA | — | — | Invention example |
| 3 | | 63 | 9 | 50 | GA | — | — | Comparative example |
| 4 | | 63 | 9 | 50 | GA | — | — | Comparative example |
| 5 | | 63 | 9 | 50 | Electrogalvanizing | 233 | 52 | Invention example |
| 6 | | 63 | 8 | 50 | Electrogalvanizing | 214 | 103 | Invention example |
| 7 | | 63 | 8 | 50 | Electrogalvanizing | 208 | 180 | Invention example |
| 8 | | 63 | 8 | 50 | Electrogalvanizing | 198 | 320 | Invention example |
| 9 | B | 63 | 7 | 80 | GI | — | — | Invention example |
| 10 | | — | 6 | 90 | GI | — | — | Invention example |
| 11 | | 63 | 5 | 100 | GI | — | — | Invention example |
| 12 | | 63 | 5 | 120 | GI | — | — | Invention example |
| 13 | | 63 | 32 | 7 | GI | — | — | Comparative example |
| 14 | | 63 | 14 | 35 | GI | 150 | 120 | Invention example |
| 15 | | 63 | 9 | 60 | GI | 150 | 120 | Invention example |
| 16 | | 63 | 8 | 80 | GI | 150 | 120 | Invention example |
| 17 | C | 63 | 18 | 25 | GI | 55 | 3600 | Invention example |
| 18 | | 63 | 18 | 25 | GI | 80 | 600 | Invention example |
| 19 | | 63 | 18 | 25 | GI | 120 | 60 | Invention example |
| 20 | D | 63 | 18 | 25 | GI | 80 | 600 | Invention example |
| 21 | | 63 | 18 | 25 | GI | 150 | 60 | Invention example |
| 22 | | 63 | 18 | 25 | GI | — | — | Comparative example |
| 23 | E | 63 | 9 | 62 | GI | — | — | Invention example |
| 24 | | — | 9 | 64 | GI | — | — | Invention example |
| 25 | | 63 | 8 | 58 | GI | — | — | Invention example |
| 26 | F | 63 | 14 | 38 | GI | 210 | 41 | Comparative example |
| 27 | | 63 | 18 | 26 | GI | 198 | 35 | Invention example |
| 28 | | 63 | 19 | 20 | GI | — | — | Comparative example |
| 29 | G | 63 | 19 | 20 | GI | — | — | Comparative example |
| 30 | | 63 | 8 | 60 | GI | — | — | Invention example |
| 31 | | 63 | 7 | 80 | GI | — | — | Invention example |
| 32 | H | 63 | 11 | 40 | GI | — | — | Invention example |
| 33 | | — | 9 | 60 | GI | — | — | Invention example |
| 34 | | 63 | 7 | 80 | GI | — | — | Invention example |
| 35 | I | 63 | 12 | 38 | GA | — | — | Invention example |
| 36 | | 63 | 11 | 47 | GA | — | — | Invention example |
| 37 | | 63 | 11 | 48 | GA | — | — | Invention example |
| 38 | | 63 | 11 | 51 | GA | — | — | Invention example |
| 39 | J | 63 | 10 | 55 | GA | 110 | 56 | Invention example |
| 40 | | 63 | 10 | 59 | GA | 88 | 73 | Invention example |
| 41 | | 63 | 9 | 67 | GA | 75 | 90 | Invention example |
| 42 | | 63 | 8 | 71 | GA | 68 | 97 | Invention example |
| 43 | K | 63 | 19 | 24 | GI | 38 | 600 | Comparative example |
| 44 | | 63 | 20 | 21 | GI | 65 | 520 | Invention example |
| 45 | | 63 | 19 | 28 | GI | 60 | 450 | Invention example |
| 46 | | 63 | 19 | 30 | GI | 55 | 300 | Invention example |
| 47 | L | — | 20 | 21 | GI | 153 | 49 | Comparative example |
| 48 | | — | 19 | 27 | GI | 182 | 54 | Invention example |
| 49 | | — | 11 | 48 | GI | 201 | 64 | Invention example |
| 50 | M | 63 | 11 | 46 | GA | — | — | Invention example |
| 51 | | — | 10 | 57 | GA | — | — | Invention example |
| 52 | | 63 | 10 | 55 | GA | — | — | Invention example |
| 53 | | 63 | | 18 | GA | — | — | Comparative example |
| 54 | N | 63 | 23 | 16 | GI | 55 | 300 | Comparative example |
| 55 | | 63 | 22 | 18 | GI | 153 | 49 | Invention example |
| 56 | | 63 | 22 | 18 | GI | 182 | 54 | Invention example |
| 57 | | 63 | 20 | 20 | GI | 201 | 64 | Invention example |
| 58 | O | 63 | 20 | 21 | Electrogalvanizing | 270 | 49 | Invention example |
| 59 | | 63 | 21 | 18 | Electrogalvanizing | 156 | 105 | Invention example |
| 60 | | 63 | 14 | 38 | Electrogalvanizing | 164 | 50 | Invention example |
| 61 | | 63 | 21 | 19 | Electrogalvanizing | — | — | Comparative example |
| 62 | | 63 | 20 | 20 | Electrogalvanizing | — | — | Comparative example |
| 63 | P | 50 | 23 | 16 | GA | 161 | 118 | Comparative example |
| 64 | | 63 | 14 | 33 | GA | 55 | 86400 | Invention example |
| 65 | | 63 | 17 | 26 | GA | 280 | 61 | Invention example |
| 66 | Q | 63 | 17 | 24 | GA | 109 | 28 | Comparative example |
| 67 | | 63 | 18 | 22 | GA | 40 | 67 | Comparative example |
| 68 | | 63 | 18 | 23 | GA | 320 | 91 | Comparative example |

TABLE 2-continued

| No. | Steel | | | | | | | |
|---|---|---|---|---|---|---|---|---|
| 69 | | 63 | 14 | 35 | GA | 241 | 62 | Invention example |
| 70 | | 63 | 17 | 29 | GA | 233 | 52 | Invention example |
| 71 | | 1250 | 18 | 22 | GA | 214 | 103 | Invention example |
| 72 | R | 63 | 17 | 27 | GI | 208 | 50 | Comparative example |
| 73 | | 63 | 18 | 24 | GI | 198 | 60 | Comparative example |
| 74 | | 63 | 15 | 31 | GI | 285 | 83 | Invention example |
| 75 | | 63 | 8 | 82 | GI | — | — | Invention example |
| 76 | | 63 | 18 | 25 | GI | — | — | Comparative example |
| 77 | | 63 | 8 | 62 | GA | — | — | Comparative example |
| 78 | S | 50 | 2 | 200 | GA | — | — | Invention example |
| 79 | | 63 | 6 | 91 | GA | — | — | Invention example |
| 80 | | 63 | 4 | 146 | GA | — | — | Invention example |
| 81 | T | 63 | 11 | 44 | GA | — | — | Invention example |
| 82 | | 63 | 10 | 49 | GA | — | — | Invention example |
| 83 | | 63 | 5 | 106 | GA | — | — | Invention example |
| 84 | U | 63 | 10 | 53 | GA | — | — | Comparative example |
| 85 | | 63 | 14 | 36 | GA | — | — | Invention example |
| 86 | | 63 | 9 | 64 | GA | — | — | Invention example |
| 87 | V | 63 | 10 | 56 | GA | — | — | Comparative example |
| 88 | | 63 | 5 | 111 | GA | — | — | Comparative example |
| 89 | | 63 | 10 | 47 | GA | — | — | Comparative example |
| 90 | W | 63 | 11 | 41 | GI | — | — | Comparative example |
| 91 | X | 63 | 11 | 43 | GI | — | — | Comparative example |
| 92 | Y | 63 | 10 | 51 | GI | — | — | Comparative example |
| 93 | Z | 63 | 11 | 43 | GI | — | — | Comparative example |
| 94 | AA | 63 | 11 | 42 | GI | — | — | Comparative example |
| 95 | AB | 63 | 11 | 46 | GI | — | — | Comparative example |
| 96 | AC | 63 | 10 | 48 | GI | — | — | Comparative example |
| 97 | AD | 63 | 9 | 59 | GI | — | — | Comparative example |
| 98 | AE | 63 | 8 | 67 | GI | — | — | Comparative example |
| 99 | AF | 63 | 4 | 112 | GI | — | — | Comparative example |
| 100 | AG | 63 | 11 | 44 | GI | — | — | Comparative example |
| 101 | AH | 63 | 8 | 86 | GI | — | — | Comparative example |
| 102 | AI | 63 | 11 | 46 | GI | — | — | Comparative example |
| 103 | AJ | 63 | 10 | 49 | GI | — | — | Comparative example |
| 104 | AK | 63 | 10 | 47 | GI | — | — | Comparative example |
| 105 | AL | 63 | 10 | 53 | GI | — | — | Comparative example |
| 106 | AM | 63 | 11 | 43 | GI | — | — | Comparative example |
| 107 | AN | 63 | 9 | 61 | GI | — | — | Comparative example |
| 108 | AO | 63 | 8 | 72 | GI | — | — | Comparative example |
| 109 | | 63 | 7 | 84 | GI | — | — | Comparative example |

Evaluation Method

The galvanized steel sheets produced under various production conditions were subjected to a microstructure analysis in order to determine the fractions of microstructures, subjected to a tensile test in order to determine tensile properties such as tensile strength, and subjected to a constant-load tensile test in order to determine delayed fracture resistance. The methods for conducting the above evaluations are as follows.

(Area Fraction of Martensite and Tempered Martensite)

A specimen was taken from each of the galvanized steel sheets in the rolling direction and a direction perpendicular to the rolling direction. An L-cross section of the specimen taken in the thickness direction and parallel to the rolling direction was mirror-polished. After the microstructures had been revealed with nital, an observation was made with an electron scanning microscope. The area fraction of martensite and tempered martensite was determined by a point counting method, that is, by placing a 16×15 grid of 4.8 μm intervals in a region of the SEM image taken at a 1500-fold magnification, the region having actual lengths of 82 μm×57 μm, and counting the number of points located on each of the phases. The average of three area fractions determined using different SEM images taken at a 1500-fold magnification was used as the area fraction of martensite and tempered martensite. Martensite appeared as a white microstructure. Although tempered martensite also appeared as a white microstructure, the microstructure included blocks and packets that were present inside the prior-austenite grain boundaries because tempered martensite is more likely to be corroded than martensite.

The area fractions of the other microstructures, that is, ferrite, pearlite, and bainite, were also determined by the same method as described above. The above microstructures were distinguished from one another in accordance with color and the form of the carbide included in the microstructure; ferrite appeared as a black microstructure, pearlite appeared as a microstructure constituted by ferrite and carbide arranged in a lamellar manner, and bainite appeared as a microstructure including carbide particles dispersed inside the grains.

(Tensile Test)

A JIS No. 5 specimen with a gage length of 50 mm, a gage width of 25 mm, and a thickness of 1.2 mm was taken from each of the galvanized steel sheets in a direction perpendicular to the rolling direction (such that the width direction of the specimen was parallel to the direction in which a tensile force was to be applied). The specimen was subjected to a tensile test with a cross head speed of 10 mm/minute in order to measure tensile strength (TS) and total elongation (El).

(Delayed Fracture Test)

A strip-like steel sheet sample having a major axis of 100 mm and a minor axis of 20 mm was taken from each of the galvanized steel sheets in a direction perpendicular to the rolling direction. A hole having a diameter of 15 mm was punched with a clearance of 12.5% at the center of the strip-like steel sheet sample in the major and minor axis directions. Delayed fracture resistance was evaluated according to whether delayed fracture occurred at the hole. Note that the amount of time it took from when the strip-like steel sheet sample was taken from the steel sheet to when the tensile test for delayed fracture was started was set to be 10 minutes or less in order to avoid the release of diffusible hydrogen included in the steel which occurs with time. The loading time was set to 100 hours at maximum. The maximum stress at which cracking did not occur after the 100-hour loading (the term "cracking" used herein refers to rupture that occurs upon the loading of a tensile stress) was considered to be critical stress. Evaluation of delayed fracture resistance was conducted on the basis of the ratio of the critical stress to the yield stress; when Critical stress/Yield stress is 1.00 or more, it was considered that delayed fracture resistance was excellent, and when Critical stress/Yield stress is less than 1.00, it was considered that delayed fracture resistance was poor.

(Hydrogen Analysis Method)

A strip-like steel sheet sample having a major axis of 30 mm and a minor axis of 5 mm was taken from each of the galvanized steel sheets at the center of the galvanized steel sheet in the width direction. After the sampling, the galvanizing layer present on the surface of the steel sheet sample was completely removed with a handy router. Immediately after the removal of the galvanizing layer, a hydrogen analysis was conducted using a thermal desorption spectrometer with an analysis start temperature of 25° C., an analysis end temperature of 300° C., and a rate of temperature rise of 200° C./hour. The rate at which hydrogen became released from the surface of the steel sheet sample, that is, the hydrogen release rate (wt. ppm/min), was measured at each predetermined temperature. The half-width of the hydrogen desorption peak was calculated on the basis of the relationship between the hydrogen release rate and temperature. Furthermore, the total amount of hydrogen released while the temperature increased from the analysis start temperature to 200° C. was calculated as diffusible hydrogen content.

The FIGURE illustrates an example of the hydrogen profile used for calculating the diffusible hydrogen content in the steel and the half-width of the hydrogen release peak. The diffusible hydrogen content to 200° C. was calculated from the area corresponding to heating to 200° C. The half-width of the hydrogen release peak was calculated from the maximum and minimum temperatures at which the hydrogen release rate was half the peak value.

(Coatability)

In the evaluation of coatability, an observation was made visually and with a SEM. A steel sheet that included a galvanizing layer uniformly formed over the entire surface was evaluated as having good coatability (O (Good)). When the galvanizing layer was absent on a portion of the surface of a steel sheet, the steel sheet was evaluated as having poor coatability (x (NG)). The evaluation of coatability by SEM observation was conducted by observing the surface of each of the steel sheets at a 150-fold magnification.

TABLE 3

| No. | Steel type | Microstructure M + TM % | α % | P + B % | Diffusive hydrogen content in steel wt. ppm | Hydrogen desorption peak half-width ° C. | Mechanical properties YS MPa | TS MPa | EI % | Delayed fracture resistance Critical stress MPa | Critical stress/yield stress | Coatability | |
|---|---|---|---|---|---|---|---|---|---|---|---|---|---|
| 1 | A | 45 | 5 | 50 | 0.32 | 54 | 786 | 985 | 14.9 | 860 | 1.09 | o | Invention example |
| 2 |   | 61 | 2 | 37 | 0.35 | 60 | 869 | 1080 | 12.3 | 930 | 1.07 | o | Invention example |
| 3 |   | 28 | 24 | 48 | 0.48 | 66 | 688 | 971 | 15.7 | 690 | 1.00 | o | Comparative example |
| 4 |   | 47 | 4 | 49 | 0.62 | 59 | 811 | 988 | 14.4 | 790 | 0.97 | o | Comparative example |
| 5 |   | 44 | 5 | 51 | 0.31 | 59 | 795 | 992 | 14 | 860 | 1.08 | o | invention example |
| 6 |   | 45 | 4 | 51 | 0.28 | 60 | 791 | 995 | 14.1 | 900 | 1.14 | o | Invention example |
| 7 |   | 44 | 3 | 53 | 0.25 | 57 | 797 | 987 | 14.9 | 910 | 1.14 | o | Invention example |
| 8 |   | 47 | 3 | 50 | 0.23 | 55 | 808 | 996 | 14.5 | 930 | 1.15 | o | Invention example |
| 9 | B | 48 | 4 | 48 | 0.25 | 55 | 813 | 1034 | 13.3 | 910 | 1.12 | o | Invention example |
| 10 |   | 67 | 1 | 32 | 0.27 | 58 | 916 | 1246 | 9.6 | 1010 | 1.10 | o | Invention example |
| 11 |   | 45 | 5 | 50 | 0.25 | 63 | 801 | 1028 | 12.8 | 920 | 1.15 | o | Invention example |
| 12 |   | 46 | 4 | 50 | 0.24 | 52 | 805 | 1021 | 12.6 | 940 | 1.17 | o | Invention example |
| 13 |   | 46 | 4 | 50 | 0.46 | 74 | 808 | 1146 | 11.2 | 790 | 0.98 | o | Comparative example |
| 14 |   | 35 | 11 | 54 | 0.36 | 57 | 787 | 1132 | 11.4 | 830 | 1.05 | o | Invention example |
| 15 |   | 46 | 5 | 49 | 0.26 | 58 | 806 | 1067 | 12.2 | 900 | 1.12 | o | Invention example |
| 16 |   | 47 | 4 | 49 | 0.22 | 47 | 811 | 1059 | 12.3 | 970 | 1.20 | o | Invention example |
| 17 | C | 36 | 11 | 53 | 0.37 | 60 | 716 | 1036 | 13.8 | 760 | 1.06 | o | Invention example |
| 18 |   | 37 | 12 | 51 | 0.34 | 61 | 719 | 1041 | 13.6 | 760 | 1.06 | o | Invention example |
| 19 |   | 35 | 11 | 54 | 0.37 | 60 | 708 | 1038 | 13.6 | 750 | 1.06 | o | Invention example |
| 20 | D | 54 | 3 | 43 | 0.31 | 67 | 848 | 1191 | 11.5 | 890 | 1.05 | o | Invention example |
| 21 |   | 46 | 5 | 49 | 0.45 | 59 | 774 | 1167 | 10.9 | 780 | 1.01 | o | Invention example |
| 22 |   | 42 | 4 | 54 | 0.45 | 75 | 756 | 1152 | 11.7 | 740 | 0.98 | o | Comparative example |
| 23 | E | 35 | 10 | 55 | 0.29 | 52 | 709 | 1108 | 11.8 | 790 | 1.11 | o | Invention example |
| 24 |   | 34 | 11 | 55 | 0.3 | 49 | 838 | 1224 | 9.7 | 940 | 1.12 | o | Invention example |
| 25 |   | 34 | 10 | 56 | 0.31 | 50 | 702 | 1116 | 11.7 | 780 | 1.11 | o | invention example |
| 26 | F | 19 | 28 | 53 | 0.38 | 58 | 647 | 914 | 21.8 | 680 | 1.05 | o | Comparative example |
| 27 |   | 38 | 14 | 48 | 0.38 | 57 | 784 | 997 | 13.6 | 820 | 1.05 | o | Invention example |
| 28 |   | 56 | 3 | 41 | 0.42 | 75 | 876 | 1136 | 11.8 | 840 | 0.96 | o | Comparative example |
| 29 | G | 44 | 5 | 51 | 0.53 | 76 | 703 | 1159 | 11 | 680 | 0.97 | o | Comparative example |
| 30 |   | 46 | 4 | 50 | 0.41 | 33 | 799 | 1164 | 10.7 | 950 | 1.19 | o | Invention example |
| 31 |   | 46 | 5 | 49 | 0.36 | 34 | 704 | 1170 | 10.6 | 860 | 1.22 | o | Invention example |
| 32 | H | 44 | 5 | 51 | 0.42 | 30 | 698 | 1011 | 13.1 | 840 | 1.20 | o | Invention example |
| 33 |   | 58 | 3 | 39 | 0.38 | 44 | 784 | 1121 | 11.5 | 930 | 1.19 | o | Invention example |
| 34 |   | 43 | 4 | 53 | 0.35 | 35 | 701 | 990 | 13.9 | 870 | 1.24 | o | Invention example |
| 35 | I | 48 | 5 | 47 | 0.40 | 48 | 1026 | 1377 | 12.4 | 1150 | 1.12 | o | Invention example |
| 36 |   | 47 | 4 | 49 | 0.38 | 49 | 1010 | 1382 | 12.6 | 1140 | 1.13 | o | Invention example |
| 37 |   | 47 | 3 | 50 | 0.41 | 46 | 1009 | 1374 | 12.8 | 1140 | 1.13 | o | Invention example |

TABLE 3-continued

| No. | Steel type | Microstructure M + TM % | Microstructure α % | Microstructure P + B % | Diffusive hydrogen content in steel wt. ppm | Hydrogen desorption peak half-width ° C. | Mechanical properties YS MPa | Mechanical properties TS MPa | Mechanical properties EI % | Delayed fracture resistance Critical stress MPa | Delayed fracture resistance Critical stress/yield stress | Coatability | |
|---|---|---|---|---|---|---|---|---|---|---|---|---|---|
| 38 |   | 46 | 3 | 51 | 0.39 | 50 | 1021 | 1372 | 12.5 | 1160 | 1.14 | ○ | Invention example |
| 39 | J | 47 | 4 | 49 | 0.36 | 42 | 911 | 1266 | 12.9 | 1070 | 1.17 | ○ | Invention example |
| 40 |   | 45 | 5 | 50 | 0.43 | 47 | 924 | 1263 | 13 | 1030 | 1.11 | ○ | Invention example |
| 41 |   | 43 | 5 | 52 | 0.39 | 46 | 921 | 1259 | 13.1 | 1040 | 1.13 | ○ | invention example |
| 42 |   | 45 | 4 | 51 | 0.38 | 45 | 919 | 1255 | 13.4 | 1050 | 1.14 | ○ | Invention example |
| 43 | K | 49 | 3 | 48 | 0.54 | 46 | 1021 | 1337 | 11.3 | 910 | 0.89 | ○ | Comparative example |
| 44 |   | 47 | 4 | 49 | 0.48 | 43 | 1015 | 1331 | 11.2 | 1080 | 1.06 | ○ | Invention example |
| 45 |   | 44 | 4 | 52 | 0.44 | 37 | 1011 | 1330 | 11.2 | 1110 | 1.10 | ○ | Invention example |
| 46 |   | 46 | 4 | 50 | 0.45 | 38 | 1016 | 1343 | 11 | 1110 | 1.09 | ○ | Invention example |
| 47 | L | 28 | 21 | 51 | 0.32 | 45 | 655 | 948 | 18.5 | 780 | 1.19 | ○ | Comparative example |
| 48 |   | 46 | 5 | 49 | 0.29 | 69 | 708 | 1074 | 12.9 | 870 | 1.23 | ○ | Invention example |
| 49 |   | 59 | 3 | 38 | 0.38 | 46 | 872 | 1144 | 11.4 | 990 | 1.14 | ○ | Invention example |
| 50 | M | 48 | 5 | 47 | 0.29 | 45 | 824 | 1113 | 11.7 | 960 | 1.17 | ○ | Invention example |
| 51 |   | 61 | 2 | 37 | 0.34 | 43 | 958 | 1289 | 8.6 | 1080 | 1.13 | ○ | Invention example |
| 52 |   | 47 | 4 | 49 | 0.28 | 41 | 813 | 1110 | 11.8 | 970 | 1.19 | ○ | Invention example |
| 53 |   | 46 | 4 | 50 | 0.32 | 81 | 808 | 1104 | 11.9 | 780 | 0.97 | ○ | Comparative example |
| 54 | N | 24 | 22 | 54 | 0.24 | 45 | 724 | 945 | 17.2 | 810 | 1.12 | ○ | Comparative example |
| 55 |   | 35 | 15 | 50 | 0.27 | 40 | 757 | 992 | 15.1 | 910 | 1.20 | ○ | Invention example |
| 56 |   | 48 | 4 | 48 | 0.32 | 41 | 771 | 1008 | 13.4 | 900 | 1.17 | ○ | Invention example |
| 57 |   | 56 | 3 | 41 | 0.28 | 40 | 793 | 1023 | 12.6 | 940 | 1.19 | ○ | Invention example |
| 58 | O | 47 | 5 | 48 | 0.40 | 46 | 809 | 1187 | 10.7 | 870 | 1.08 | ○ | Invention example |
| 59 |   | 45 | 4 | 51 | 0.39 | 46 | 806 | 1191 | 10.7 | 880 | 1.09 | ○ | Invention example |
| 60 |   | 47 | 4 | 49 | 0.43 | 48 | 816 | 1174 | 10.8 | 870 | 1.07 | ○ | Invention example |
| 61 |   | 56 | 3 | 41 | 0.47 | 72 | 857 | 1208 | 9.9 | 840 | 0.98 | ○ | Comparative example |
| 62 |   | 52 | 4 | 44 | 0.83 | 86 | 853 | 1211 | 10 | 730 | 0.86 | ○ | Comparative example |
| 63 | P | 22 | 24 | 54 | 0.39 | 48 | 638 | 960 | 16.5 | 730 | 1.14 | ○ | Comparative example |
| 64 |   | 40 | 9 | 51 | 0.31 | 35 | 776 | 1082 | 12.2 | 960 | 1.24 | ○ | Invention example |
| 65 |   | 42 | 7 | 51 | 0.47 | 41 | 801 | 1217 | 9.9 | 900 | 1.12 | ○ | Invention example |
| 66 | Q | 56 | 3 | 41 | 0.68 | 81 | 857 | 1067 | 12.9 | 790 | 0.92 | ○ | Comparative example |
| 67 |   | 58 | 3 | 39 | 0.56 | 84 | 862 | 1081 | 12.7 | 780 | 0.90 | ○ | Comparative example |
| 68 |   | 26 | 14 | 60 | 0.32 | 45 | 678 | 957 | 19.8 | 800 | 1.18 | ○ | Comparative example |
| 69 |   | 59 | 3 | 38 | 0.34 | 44 | 868 | 1094 | 12.2 | 1000 | 1.15 | ○ | Invention example |
| 70 |   | 58 | 3 | 39 | 0.33 | 47 | 859 | 1209 | 9.8 | 990 | 1.15 | ○ | Invention example |
| 71 |   | 32 | 4 | 64 | 0.32 | 45 | 689 | 986 | 16.4 | 800 | 1.16 | ○ | Invention example |
| 72 | R | 24 | 9 | 67 | 0.33 | 43 | 684 | 964 | 18.4 | 800 | 1.17 | ○ | Comparative example |
| 73 |   | 21 | 10 | 69 | 0.31 | 39 | 672 | 943 | 19.8 | 790 | 1.18 | ○ | Comparative example |
| 74 |   | 48 | 4 | 48 | 0.36 | 42 | 842 | 1128 | 11.5 | 960 | 1.14 | ○ | Invention example |
| 75 |   | 50 | 4 | 46 | 0.32 | 45 | 849 | 1107 | 11.4 | 980 | 1.15 | ○ | Invention example |
| 76 |   | 51 | 4 | 45 | 0.42 | 81 | 848 | 1142 | 11.3 | 800 | 0.94 | ○ | Comparative example |
| 77 |   | 50 | 4 | 46 | 0.59 | 45 | 842 | 1114 | 11.1 | 830 | 0.99 | ○ | Comparative example |
| 78 | S | 35 | 11 | 54 | 0.41 | 25 | 726 | 1144 | 11.2 | 890 | 1.23 | ○ | Invention example |
| 79 |   | 51 | 4 | 45 | 0.39 | 36 | 847 | 1157 | 11.7 | 1050 | 1.24 | ○ | Invention example |
| 80 |   | 58 | 3 | 39 | 0.32 | 35 | 921 | 1152 | 11.6 | 1140 | 1.24 | ○ | Invention example |
| 81 | T | 41 | 5 | 54 | 0.43 | 62 | 685 | 1124 | 14.9 | 660 | 1.03 | ○ | Invention example |
| 82 |   | 42 | 5 | 53 | 0.43 | 58 | 841 | 1127 | 13.1 | 860 | 1.02 | ○ | Invention example |
| 83 |   | 52 | 4 | 44 | 0.42 | 57 | 850 | 1179 | 12.8 | 880 | 1.04 | ○ | Invention example |
| 84 | U | 28 | 21 | 51 | 0.42 | 58 | 686 | 974 | 14.9 | 710 | 1.03 | ○ | Comparative example |
| 85 |   | 56 | 4 | 40 | 0.48 | 59 | 859 | 1142 | 11.1 | 860 | 1.00 | ○ | Invention example |
| 86 |   | 54 | 4 | 42 | 0.47 | 60 | 852 | 1286 | 8.8 | 860 | 1.01 | ○ | Invention example |
| 87 | V | 11 | 24 | 65 | 0.38 | 54 | 644 | 821 | 22.2 | 680 | 1.06 | ○ | Comparative example |
| 88 |   | 16 | 18 | 66 | 0.41 | 64 | 667 | 843 | 21.5 | 710 | 1.06 | ○ | Comparative example |
| 89 |   | 19 | 12 | 69 | 0.21 | 65 | 689 | 867 | 20.3 | 820 | 1.19 | ○ | Comparative example |
| 90 | W | 23 | 13 | 64 | 0.23 | 62 | 693 | 871 | 20.1 | 830 | 1.20 | ○ | Comparative example |
| 91 | X | 70 | 0 | 30 | 0.53 | 66 | 1048 | 1271 | 8.9 | 980 | 0.94 | ○ | Comparative example |
| 92 | Y | 71 | 0 | 29 | 0.59 | 65 | 1056 | 1297 | 8.5 | 990 | 0.94 | ○ | Comparative example |
| 93 | Z | 47 | 4 | 49 | 0.33 | 48 | 726 | 1058 | 12.6 | 810 | 1.12 | x | Comparative example |
| 94 | AA | 43 | 4 | 53 | 0.35 | 46 | 715 | 1031 | 12.8 | 810 | 1.13 | x | Comparative example |
| 95 | AB | 24 | 8 | 68 | 0.23 | 64 | 600 | 782 | 26.1 | 720 | 1.20 | ○ | Comparative example |
| 96 | AC | 25 | 8 | 67 | 0.24 | 61 | 767 | 954 | 16.1 | 910 | 1.19 | ○ | Comparative example |
| 97 | AD | 74 | 0 | 26 | 0.62 | 50 | 1078 | 1316 | 9.2 | 1050 | 0.97 | ○ | Comparative example |
| 98 | AE | 68 | 1 | 31 | 0.61 | 63 | 1063 | 1305 | 9.4 | 1030 | 0.97 | ○ | Comparative example |
| 99 | AF | 55 | 2 | 43 | 0.72 | 61 | 764 | 1147 | 13.7 | 680 | 0.89 | ○ | Comparative example |
| 100 | AG | 58 | 2 | 40 | 0.71 | 59 | 798 | 1081 | 11.9 | 710 | 0.89 | ○ | Comparative example |
| 101 | AH | 43 | 4 | 53 | 0.57 | 60 | 802 | 1055 | 12.7 | 770 | 0.96 | ○ | Comparative example |
| 102 | AI | 41 | 4 | 55 | 0.58 | 58 | 669 | 1087 | 14.2 | 640 | 9.96 | ○ | Comparative example |
| 103 | AJ | 37 | 7 | 56 | 0.55 | 59 | 880 | 1210 | 9 | 850 | 0.97 | ○ | Comparative example |
| 104 | AK | 34 | 7 | 59 | 0.56 | 57 | 743 | 1065 | 12.2 | 720 | 9.97 | ○ | Comparative example |
| 105 | AL | 32 | 6 | 62 | 0.54 | 56 | 768 | 994 | 13.6 | 740 | 0.96 | ○ | Comparative example |
| 106 | AM | 32 | 6 | 62 | 0.55 | 54 | 771 | 1004 | 13.4 | 750 | 0.97 | ○ | Comparative example |

TABLE 3-continued

| No. | Steel type | Microstructure M + TM % | α % | P + B % | Diffusive hydrogen content in steel wt. ppm | Hydrogen desorption peak half-width °C. | Mechanical properties YS MPa | TS MPa | EI % | Delayed fracture resistance Critical stress MPa | Critical stress/yield stress | Coatability | |
|---|---|---|---|---|---|---|---|---|---|---|---|---|---|
| 107 | AN | 42 | 5 | 53 | 0.61 | 59 | 772 | 1072 | 13.3 | 750 | 0.97 | o | Comparative example |
| 108 | AO | 44 | 5 | 51 | 0.58 | 58 | 776 | 1024 | 12.9 | 740 | 0.95 | o | Comparative example |
| 109 |    | 48 | 4 | 48 | 0.47 | 57 | 781 | 1041 | 12.5 | 790 | 1.01 | x | Comparative example |

Evaluation Results

In Examples (Invention examples), a tensile strength (TS) of 980 MPa or more was achieved, the difference between critical stress and yield stress was 1.00 or more, and coatability was evaluated as "10". Invention examples are denoted as "Invention steel" in Table 3. In Comparative examples, tensile strength (TS) was less than 980 MPa, the difference between critical stress and yield stress was less than 1.00, or coatability was evaluated as "x". In Tables 1 to 3, the cells with underlined text indicate that the values do not meet the requirement, production condition, or property according to aspects of the present invention.

The invention claimed is:

1. A high-strength galvanized steel sheet comprising:
   a steel sheet having a composition containing, by mass,
   C: 0.10% or more and 0.5% or less,
   Si: 0.001% or more and less than 0.5%,
   Mn: 2.0% or more and 3.5% or less,
   P: 0.05% or less,
   S: 0.020% or less,
   Al: 0.01% or more and 1.0% or less, and
   N: 0.010% or less, and the balance being Fe and inevitable impurities,
   the steel sheet having a microstructure including martensite and tempered martensite, the total area fraction of the martensite and the tempered martensite being 30% or more; and
   a galvanizing layer formed on the surface of the steel sheet,
   wherein a diffusible hydrogen content in the high-strength galvanized steel sheet is 0.50 wt. ppm or less of molecular hydrogen, and a half-width of a hydrogen release peak of the high-strength galvanized steel sheet is 70° C. or less, the diffusible hydrogen content and the half-width of the hydrogen release peak being determined by an analysis method comprising the steps of:
   (i) taking a strip-like steel sheet sample having a major axis of 30 mm and a minor axis of 5 mm from the high-strength galvanized steel sheet at the center of the high-strength galvanized steel sheet in the width direction,
   (ii) after the steel sheet sample has been prepared, completely removing the galvanizing layer present on the surface of the steel sheet sample with a handy router,
   (iii) immediately after the removal of the galvanizing layer, conducting a hydrogen analysis using a thermal desorption spectrometer with an analysis start temperature of 25° C., an analysis end temperature of 300° C., and a rate of temperature rise of 200° C./hour, where the rate at which hydrogen is released from the surface of the steel sheet sample, that is, the hydrogen release rate (wt. ppm/min), is measured at each predetermined temperature, and
   (iv) calculating the half-width of the hydrogen release peak on the basis of the relationship between the hydrogen release rate and temperature, wherein the total amount of hydrogen released while the temperature increases from the analysis start temperature to 200° C. is calculated as diffusible hydrogen content.

2. The high-strength galvanized steel sheet according to claim 1,
   wherein the composition further contains one or two or more elements selected from at least one group of A to E, by mass,
   wherein group A comprises:
   Nb: 0.001% or more and 0.10% or less,
   Ti: 0.001% or more and 0.10% or less, and
   V: 0.001% or more and 0.3% or less;
   wherein group B comprises:
   Mo: 0.001% or more and 1.0% or less,
   Cr: 0.001% or more and 1.0% or less, and
   B: 0.005% or less;
   wherein group C comprises:
   Cu: 0.001% or more and 1.0% or less, and
   Ni: 0.001% or more and 1.0% or less;
   wherein group D comprises:
   Sn: 0.2% or less, and
   Sb: 0.2% or less; and
   wherein group E comprises:
   Mg: 0.0001% or more and 0.01% or less,
   Ca: 0.0001% or more and 0.01% or less,
   Ce: 0.0001% or more and 0.01% or less,
   La: 0.0001% or more and 0.01% or less, and
   REM: 0.0001% or more and 0.01% or less.

3. The high-strength galvanized steel sheet according to claim 2, wherein the galvanizing layer is a hot-dip galvanizing layer, a hot-dip galvannealing layer, or an electrogalvanizing layer.

4. The high-strength galvanized steel sheet according to claim 1, wherein the galvanizing layer is a hot-dip galvanizing layer, a hot-dip galvannealing layer, or an electrogalvanizing layer.

5. A method for producing the high-strength galvanized steel sheet according to claim 1, the method comprising:
   a hot-rolling step in which a slab having the composition according to claim 1 is hot-rolled with a finishing temperature of 800° C. or more and 1000° C. or less and subsequently coiled at a coiling temperature of 700° C. or less;
   an annealing step in which the hot-rolled steel sheet prepared in the hot-rolling step is heated to the temperature range of $A_{C_3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more;

a galvanizing step in which the annealed steel sheet prepared in the annealing step is subjected to a galvanizing treatment and subsequently cooled to room temperature; and a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

6. The method for producing a high-strength galvanized steel sheet according to claim 5, wherein the galvanizing treatment is a hot-dip galvanizing treatment or a hot-dip galvannealing treatment.

7. A method for producing the high-strength galvanized steel sheet according to claim 1, the method comprising:

a hot-rolling step in which a slab having the composition according to claim 1 is hot-rolled with a finishing temperature of 800° C. or more and 1000° C. or less and subsequently coiled at a coiling temperature of 700° C. or less;

a cold-rolling step in which the hot-rolled steel sheet prepared in the hot-rolling step is pickled and subsequently cold-rolled;

an annealing step in which the cold-rolled steel sheet prepared in the cold-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more;

a galvanizing step in which the annealed steel sheet prepared in the annealing step is subjected to a galvanizing treatment and subsequently cooled to room temperature; and a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

8. The method for producing a high-strength galvanized steel sheet according to claim 7, wherein the galvanizing treatment is a hot-dip galvanizing treatment or a hot-dip galvannealing treatment.

9. A method for producing the high-strength galvanized steel sheet according to claim 1, the method comprising:

a hot-rolling step in which a slab having the composition according to claim 1 is hot-rolled with a finishing temperature of 800° C. or more and 1000° C. or less and subsequently coiled at a coiling temperature of 700° C. or less;

an annealing step in which the hot-rolled steel sheet prepared in the hot-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; and a galvanizing step in which the annealed steel sheet prepared in the annealing step is subjected to a galvanizing treatment and subsequently cooled to room temperature with an average cooling rate of 1° C./second or more and 20° C./second or less such that the amount of time during which the galvanized steel sheet is retained in the temperature range of 50° C. or more and 300° C. or less is 30 seconds or more.

10. The method for producing a high-strength galvanized steel sheet according to claim 9, wherein the galvanizing treatment is a hot-dip galvanizing treatment or a hot-dip galvannealing treatment.

11. A method for producing the high-strength galvanized steel sheet according to claim 1, the method comprising:

a hot-rolling step in which a slab having the composition according to claim 1 is hot-rolled with a finishing temperature of 800° C. or more and 1000° C. or less and subsequently coiled at a coiling temperature of 700° C. or less;

a cold-rolling step in which the hot-rolled steel sheet prepared in the hot-rolling step is pickled and subsequently cold-rolled;

an annealing step in which the cold-rolled steel sheet prepared in the cold-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; and a galvanizing step in which the annealed steel sheet prepared in the annealing step is subjected to a galvanizing treatment and subsequently cooled to room temperature with an average cooling rate of 1° C./second or more and 20° C./second or less such that the amount of time during which the galvanized steel sheet is retained in the temperature range of 50° C. or more and 300° C. or less is 30 seconds or more.

12. The method for producing a high-strength galvanized steel sheet according to claim 11, wherein the galvanizing treatment is a hot-dip galvanizing treatment or a hot-dip galvannealing treatment.

13. A method for producing the high-strength galvanized steel sheet according to claim 1, the method comprising:

a hot-rolling step in which a slab having the composition according to claim 1 is hot-rolled with a finishing temperature of 800° C. or more and 1000° C. or less and subsequently coiled at a coiling temperature of 700° C. or less;

an annealing step in which the hot-rolled steel sheet prepared in the hot-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; and a galvanizing step in which the annealed steel sheet prepared in the annealing step is subjected to an electrogalvanizing treatment and, subsequent to the electrogalvanizing treatment, the electrogalvanized steel sheet is retained in the temperature range of 50° C. or more and 300° C. or less for 30 seconds or more, and subsequently cooled to room temperature.

14. A method for producing the high-strength galvanized steel sheet according to claim 1, the method comprising:

a hot-rolling step in which a slab having the composition according to claim 1 is hot-rolled with a finishing temperature of 800° C. or more and 1000° C. or less and subsequently coiled at a coiling temperature of 700° C. or less;

a cold-rolling step in which the hot-rolled steel sheet prepared in the hot-rolling step is pickled and subsequently cold-rolled;

an annealing step in which the cold-rolled steel sheet prepared in the cold-rolling step is heated to the temperature range of $A_{C_3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; and a galvanizing step in which the annealed steel sheet prepared in the annealing step is subjected to an electrogalvanizing treatment and, subsequent to the electrogalvanizing treatment, the electrogalvanized steel sheet is retained in the temperature range of 50° C. or more and 300° C. or less for 30 seconds or more, and subsequently cooled to room temperature.

15. A method for producing the high-strength galvanized steel sheet according to claim 1, the method comprising:

a hot-rolling step in which a slab having the composition according to claim 1 is hot-rolled with a finishing temperature of 800° C. or more and 1000° C. or less and subsequently coiled at a coiling temperature of 700° C. or less;

an annealing step in which the hot-rolled steel sheet prepared in the hot-rolling step is heated to the temperature range of $A_{C_3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more;

a galvanizing step in which the annealed steel sheet prepared in the annealing step is subjected to an electrogalvanizing treatment and subsequently cooled to room temperature; and a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

16. A method for producing the high-strength galvanized steel sheet according to claim 1, the method comprising:

a hot-rolling step in which a slab having the composition according to claim 1 is hot-rolled with a finishing temperature of 800° C. or more and 1000° C. or less and subsequently coiled at a coiling temperature of 700° C. or less;

a cold-rolling step in which the hot-rolled steel sheet prepared in the hot-rolling step is pickled and subsequently cold-rolled;

an annealing step in which the cold-rolled steel sheet prepared in the cold-rolling step is heated to the temperature range of $A_{C_3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more;

a galvanizing step in which the annealed steel sheet prepared in the annealing step is subjected to an electrogalvanizing treatment and subsequently cooled to room temperature; and a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

17. A method for producing the high-strength galvanized steel sheet according to claim 2, the method comprising:

a hot-rolling step in which a slab having the composition according to claim 2 is hot-rolled with a finishing temperature of 800° C. or more and 1000° C. or less and subsequently coiled at a coiling temperature of 700° C. or less;

an annealing step in which the hot-rolled steel sheet prepared in the hot-rolling step is heated to the temperature range of $A_{C_3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more;

a galvanizing step in which the annealed steel sheet prepared in the annealing step is subjected to a galvanizing treatment and subsequently cooled to room temperature; and a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

18. The method for producing a high-strength galvanized steel sheet according to claim 17, wherein the galvanizing treatment is a hot-dip galvanizing treatment or a hot-dip galvannealing treatment.

19. A method for producing the high-strength galvanized steel sheet according to claim 2, the method comprising:

a hot-rolling step in which a slab having the composition according to claim 2 is hot-rolled with a finishing temperature of 800° C. or more and 1000° C. or less and subsequently coiled at a coiling temperature of 700° C. or less;

a cold-rolling step in which the hot-rolled steel sheet prepared in the hot-rolling step is pickled and subsequently cold-rolled;

an annealing step in which the cold-rolled steel sheet prepared in the cold-rolling step is heated to the temperature range of $A_{C_3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more;

a galvanizing step in which the annealed steel sheet prepared in the annealing step is subjected to a galvanizing treatment and subsequently cooled to room temperature; and a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

20. The method for producing a high-strength galvanized steel sheet according to claim 19, wherein the galvanizing treatment is a hot-dip galvanizing treatment or a hot-dip galvannealing treatment.

21. A method for producing the high-strength galvanized steel sheet according to claim 2, the method comprising:
a hot-rolling step in which a slab having the composition according to claim 2 is hot-rolled with a finishing temperature of 800° C. or more and 1000° C. or less and subsequently coiled at a coiling temperature of 700° C. or less;
an annealing step in which the hot-rolled steel sheet prepared in the hot-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; and
a galvanizing step in which the annealed steel sheet prepared in the annealing step is subjected to a galvanizing treatment and subsequently cooled to room temperature with an average cooling rate of 1° C./second or more and 20° C./second or less such that the amount of time during which the galvanized steel sheet is retained in the temperature range of 50° C. or more and 300° C. or less is 30 seconds or more.

22. The method for producing a high-strength galvanized steel sheet according to claim 21, wherein the galvanizing treatment is a hot-dip galvanizing treatment or a hot-dip galvannealing treatment.

23. A method for producing the high-strength galvanized steel sheet according to claim 2, the method comprising:
a hot-rolling step in which a slab having the composition according to claim 2 is hot-rolled with a finishing temperature of 800° C. or more and 1000° C. or less and subsequently coiled at a coiling temperature of 700° C. or less;
a cold-rolling step in which the hot-rolled steel sheet prepared in the hot-rolling step is pickled and subsequently cold-rolled;
an annealing step in which the cold-rolled steel sheet prepared in the cold-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; and
a galvanizing step in which the annealed steel sheet prepared in the annealing step is subjected to a galvanizing treatment and subsequently cooled to room temperature with an average cooling rate of 1° C./second or more and 20° C./second or less such that the amount of time during which the galvanized steel sheet is retained in the temperature range of 50° C. or more and 300° C. or less is 30 seconds or more.

24. The method for producing a high-strength galvanized steel sheet according to claim 23, wherein the galvanizing treatment is a hot-dip galvanizing treatment or a hot-dip galvannealing treatment.

25. A method for producing the high-strength galvanized steel sheet according to claim 2, the method comprising:
a hot-rolling step in which a slab having the composition according to claim 2 is hot-rolled with a finishing temperature of 800° C. or more and 1000° C. or less and subsequently coiled at a coiling temperature of 700° C. or less;
an annealing step in which the hot-rolled steel sheet prepared in the hot-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; and
a galvanizing step in which the annealed steel sheet prepared in the annealing step is subjected to an electrogalvanizing treatment and, subsequent to the electrogalvanizing treatment, the electrogalvanized steel sheet is retained in the temperature range of 50° C. or more and 300° C. or less for 30 seconds or more, and subsequently cooled to room temperature.

26. A method for producing the high-strength galvanized steel sheet according to claim 2, the method comprising:
a hot-rolling step in which a slab having the composition according to claim 2 is hot-rolled with a finishing temperature of 800° C. or more and 1000° C. or less and subsequently coiled at a coiling temperature of 700° C. or less;
a cold-rolling step in which the hot-rolled steel sheet prepared in the hot-rolling step is pickled and subsequently cold-rolled;
an annealing step in which the cold-rolled steel sheet prepared in the cold-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more; and
a galvanizing step in which the annealed steel sheet prepared in the annealing step is subjected to an electrogalvanizing treatment and, subsequent to the electrogalvanizing treatment, the electrogalvanized steel sheet is retained in the temperature range of 50° C. or more and 300° C. or less for 30 seconds or more, and subsequently cooled to room temperature.

27. A method for producing the high-strength galvanized steel sheet according to claim 2, the method comprising:
a hot-rolling step in which a slab having the composition according to claim 2 is hot-rolled with a finishing temperature of 800° C. or more and 1000° C. or less and subsequently coiled at a coiling temperature of 700° C. or less;
an annealing step in which the hot-rolled steel sheet prepared in the hot-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more;
a galvanizing step in which the annealed steel sheet prepared in the annealing step is subjected to an electrogalvanizing treatment and subsequently cooled to room temperature; and a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

28. A method for producing the high-strength galvanized steel sheet according to claim 2, the method comprising:
   a hot-rolling step in which a slab having the composition according to claim 2 is hot-rolled with a finishing temperature of 800° C. or more and 1000° C. or less and subsequently coiled at a coiling temperature of 700° C. or less;
   a cold-rolling step in which the hot-rolled steel sheet prepared in the hot-rolling step is pickled and subsequently cold-rolled;
   an annealing step in which the cold-rolled steel sheet prepared in the cold-rolling step is heated to the temperature range of $A_{C3}$ temperature—40° C. or more, then held for 10 seconds or more in a furnace having a hydrogen concentration of 2% by volume or more and less than 10% by volume, and subsequently cooled to a cooling-stop temperature of 600° C. or less with an average cooling rate of 5° C./second or more;
   a galvanizing step in which the annealed steel sheet prepared in the annealing step is subjected to an electrogalvanizing treatment and subsequently cooled to room temperature; and
   a reheating step in which the galvanized steel sheet prepared in the galvanizing step is reheated at a heating temperature of 50° C. or more and 300° C. or less such that the amount of time during which the galvanized steel sheet is retained in the temperature range of 50° C. or more and 300° C. or less is 30 seconds or more and, subsequent to the reheating, cooled to room temperature.

* * * * *

UNITED STATES PATENT AND TRADEMARK OFFICE
CERTIFICATE OF CORRECTION

PATENT NO. : 11,180,823 B2
APPLICATION NO. : 16/484563
DATED : November 23, 2021
INVENTOR(S) : Takuya Hirashima et al.

It is certified that error appears in the above-identified patent and that said Letters Patent is hereby corrected as shown below:

In the Specification

In Columns 17 and 18, Table 1, row with Steel type V, second cell from left, column labeled C, "0.08" should read as -- 0.08 --.

In Columns 17 and 18, Table 1, row with Steel type W, second cell from left, column labeled C, "0.07" should read as -- 0.07 --.

In Columns 17 and 18, Table 1, row with Steel type X, second cell from left, column labeled C, "0.60" should read as -- 0.60 --.

In Columns 17 and 18, Table 1, row with Steel type Y, second cell from left, column labeled C, "0.56" should read as -- 0.56 --.

In Columns 17 and 18, Table 1, row with Steel type Z, third cell from left, column labeled Si, "0.70" should read as -- 0.70 --.

In Columns 17 and 18, Table 1, row with Steel type AA, third cell from left, column labeled Si, "0.65" should read as -- 0.65 --.

In Columns 17 and 18, Table 1, row with Steel type AB, fourth cell from left, column labeled Mn, "1.7" should read as -- 1.7 --.

In Columns 17 and 18, Table 1, row with Steel type AC, fourth cell from left, column labeled Mn, "1.8" should read as -- 1.8 --.

In Columns 17 and 18, Table 1, row with Steel type AD, fourth cell from left, column labeled Mn, "3.9" should read as -- 3.9 --.

Signed and Sealed this
Fifth Day of July, 2022

Katherine Kelly Vidal
*Director of the United States Patent and Trademark Office*

CERTIFICATE OF CORRECTION (continued)
U.S. Pat. No. 11,180,823 B2

In Columns 17 and 18, Table 1, row with Steel type AE, fourth cell from left, column labeled Mn, "3.7" should read as -- 3.7 --.

In Columns 17 and 18, Table 1, row with Steel type AF, fifth cell from left, column labeled P, "0.070" should read as -- 0.070 --.

In Columns 17 and 18, Table 1, row with Steel type AG, fifth cell from left, column labeled P, "0.072" should read as -- 0.072 --.

In Columns 17 and 18, Table 1, row with Steel type AH, sixth cell from left, column labeled S, "0.025" should read as -- 0.025 --.

In Columns 17 and 18, Table 1, row with Steel type AI, sixth cell from left, column labeled S, "0.023" should read as -- 0.023 --.

In Columns 17 and 18, Table 1, row with Steel type AJ, seventh cell from left, column labeled Al, "1.5" should read as -- 1.5 --.

In Columns 17 and 18, Table 1, row with Steel type AK, seventh cell from left, column labeled Al, "1.3" should read as -- 1.3 --.

In Columns 17 and 18, Table 1, row with Steel type AL, eighth cell from left, column labeled N, "0.015" should read as -- 0.015 --.

In Columns 17 and 18, Table 1, row with Steel type AM, eighth cell from left, column labeled N, "0.013" should read as -- 0.013 --.

In Columns 17 and 18, Table 1, row with Steel type AN, ninth cell from left, column labeled Nb, "0.120" should read as -- 0.120 --.

In Columns 17 and 18, Table 1, row with Steel type AO, tenth cell from left, column labeled Ti, "0.120" should read as -- 0.120 --.

In Columns 19 and 20, Table 2, row labeled No. 3, seventh cell from left, column labeled Annealing temperature, "740" should read as -- 740 --.

In Columns 19 and 20, Table 2, row labeled No. 4, ninth cell from left, column labeled Hydrogen concentration in furnace, "12" should read as -- 12 --.

In Columns 19 and 20, Table 2, row labeled No. 26, seventh cell from left, column labeled Annealing temperature, "710" should read as -- 710 --.

In Columns 19 and 20, Table 2, row labeled No. 63, seventh cell from left, column labeled Annealing temperature, "720" should read as -- 720 --.

CERTIFICATE OF CORRECTION (continued)
U.S. Pat. No. 11,180,823 B2

In Columns 21 and 22, Table 2, row labeled No. 47, seventh cell from left, column labeled Annealing temperature, "740" should read as -- 740 --.

In Columns 21 and 22, Table 2, row labeled No. 62, ninth cell from left, column labeled Hydrogen concentration in furnace, "15" should read as -- 15 --.

In Columns 21 and 22, Table 2, row labeled No. 72, eighth cell from left, column labeled Hydrogen concentration in furnace, "5" should read as -- 5 --.

In Columns 21 and 22, Table 2, row labeled No. 73, tenth cell from left, column labeled Cooling rate, "1" should read as -- 1 --.

In Columns 21 and 22, Table 2, row labeled No. 77, eighth cell from left, column labeled Annealing holding time, "7" should read as -- 17 --.

In Columns 21 and 22, Table 2, row labeled No. 77, ninth cell from left, column labeled Hydrogen concentration in furnace, "18" should read as -- 7 --.

In Columns 21 and 22, Table 2, row labeled No. 77, tenth cell from left, column labeled Cooling rate, "650" should read as -- 18 --.

In Columns 21 and 22, Table 2, row labeled No. 77, eleventh cell from left, column labeled Cooling Stop temperature, "63" should read as -- 650 --.

In Columns 21 and 22, Table 2, row labeled No. 84, seventh cell from left, column labeled Annealing temperature, "660" should read as -- 660 --.

In Columns 21 and 22, Table 2, row labeled No. 87, seventh cell from left, column labeled Annealing temperature, "700" should read as -- 700 --.

In Columns 23 and 24, Table 2, row labeled No. 13, fourth cell from left, column labeled Post-galvanizing cooling rate, "32" should read as -- 32 --.

In Columns 23 and 24, Table 2, row labeled No. 13, fifth cell from left, "7" should read as -- 7 --.

In Columns 23 and 24, Table 2, row labeled No. 22, fifth cell from left, "25" should read as -- 25 --.

In Columns 23 and 24, Table 2, row labeled No. 28, fifth cell from left, "20" should read as -- 20 --.

In Columns 23 and 24, Table 2, row labeled No. 29, fifth cell from left, "20" should read as -- 20 --.

In Columns 23 and 24, Table 2, row labeled No. 43, seventh cell from left, column labeled Reheating temperature, "38" should read as -- 38 --.

In Columns 23 and 24, Table 2, row labeled No. 53, fourth cell from left, column labeled Post-galvanizing cooling rate, blank space should read as -- 22 --.

CERTIFICATE OF CORRECTION (continued)
U.S. Pat. No. 11,180,823 B2

In Columns 23 and 24, Table 2, row labeled No. 53, fifth cell from left, "18" should read as -- 18 --.

In Columns 23 and 24, Table 2, row labeled No. 61, fifth cell from left, "19" should read as -- 19 --.

In Columns 23 and 24, Table 2, row labeled No. 62, fourth cell from left, "20" should read as -- 20 --.

In Columns 23 and 24, Table 2, row labeled No. 66, eighth cell from left, column labeled Reheating time, "28" should read as -- 28 --.

In Columns 23 and 24, Table 2, row labeled No. 67, seventh cell from left, column labeled Reheating temperature, "40" should read as -- 40 --.

In Columns 23 and 24, Table 2, row labeled No. 68, seventh cell from left, column labeled Reheating temperature, "320" should read as -- 320 --.

In Columns 23 and 24, Table 2, row labeled No. 109, ninth cell from left, column labeled Hydrogen concentration in furnace, "1" should read as -- 1 --.

In Columns 25 and 26, Table 2, row labeled No. 76, fifth cell from left, "25" should read as -- 25 --.

In Columns 27 and 28, Table 3, row labeled No. 3, third cell from left, column labeled M+TM, "28" should read as -- 28 --.

In Columns 27 and 28, Table 3, row labeled No. 3, ninth cell from left, column labeled TS, "971" should read as -- 971 --.

In Columns 27 and 28, Table 3, row labeled No. 4, sixth cell from left, column labeled Diffusive hydrogen content in steel, "0.62" should read as -- 0.62 --.

In Columns 27 and 28, Table 3, row labeled No. 4, twelfth cell from left, column labeled Critical stress/yield stress, "0.97" should read as -- 0.97 --.

In Columns 27 and 28, Table 3, row labeled No. 13, seventh cell from left, column labeled Hydrogen desorption peak width, "74" should read as -- 74 --.

In Columns 27 and 28, Table 3, row labeled No. 13, twelfth cell from left, column labeled Critical stress/yield stress, "0.98" should read as -- 0.98 --.

In Columns 27 and 28, Table 3, row labeled No. 22, seventh cell from left, column labeled Hydrogen desorption peak width, "75" should read as -- 75 --.

In Columns 27 and 28, Table 3, row labeled No. 22, twelfth cell from left, column labeled Critical stress/yield stress, "0.98" should read as -- 0.98 --.

In Columns 27 and 28, Table 3, row labeled No. 26, third cell from left, column labeled M+TM, "19" should read as -- 19 --.

CERTIFICATE OF CORRECTION (continued)
U.S. Pat. No. 11,180,823 B2

In Columns 27 and 28, Table 3, row labeled No. 26, ninth cell from left, column labeled Mechanical Properties TS MPa, "914" should read as -- 914 --.

In Columns 27 and 28, Table 3, row labeled No. 28, seventh cell from left, column labeled Hydrogen desorption peak half-width, "75" should read as -- 75 --.

In Columns 27 and 28, Table 3, row labeled No. 28, twelfth cell from left, column labeled Critical stress/yield stress, "0.96" should read as -- 0.96 --.

In Columns 27 and 28, Table 3, row labeled No. 29, sixth cell from left, column labeled Diffusive hydrogen content in steel, "0.53" should read as -- 0.53 --.

In Columns 27 and 28, Table 3, row labeled No. 29, seventh cell from left, column labeled Hydrogen desorption peak half-width, "76" should read as -- 76 --.

In Columns 27 and 28, Table 3, row labeled No. 29, twelfth cell from left, column labeled Critical stress/yield stress, "0.97" should read as -- 0.97 --.

In Columns 27 and 28, Table 3, row labeled No. 47, third cell from left, column labeled M+TM, "28" should read as -- 28 --.

In Columns 27 and 28, Table 3, row labeled No. 54, third cell from left, column labeled M+TM, "24" should read as -- 24 --.

In Columns 27 and 28, Table 3, row labeled No. 63, third cell from left, column labeled M+TM, "22" should read as -- 22 --.

In Columns 27 and 28, Table 3, row labeled No. 68, third cell from left, column labeled M+TM, "26" should read as -- 26 --.

In Columns 27 and 28, Table 3, row labeled No. 90, ninth cell from left, column labeled TS, "871" should read as -- 871 --.

In Columns 29 and 30, Table 3, row labeled No. 43, sixth cell from left, column labeled Diffusive hydrogen content in steel, "0.54" should read as -- 0.54 --.

In Columns 29 and 30, Table 3, row labeled No. 43, twelfth cell from left, column labeled Critical stress/yield stress, "0.89" should read as -- 0.89 --.

In Columns 29 and 30, Table 3, row labeled No. 47, ninth cell from left, column labeled TS, "948" should read as -- 948 --.

In Columns 29 and 30, Table 3, row labeled No. 53, seventh cell from left, column labeled Hydrogen desorption peak half-width, "81" should read as -- 81 --.

CERTIFICATE OF CORRECTION (continued)  Page 6 of 10
U.S. Pat. No. 11,180,823 B2

In Columns 29 and 30, Table 3, row labeled No. 53, twelfth cell from left, column labeled Diffusive hydrogen content in steel, "0.97" should read as -- 0.97 --.

In Columns 29 and 30, Table 3, row labeled No. 54, ninth cell from left, column labeled TS, "945" should read as -- 945 --.

In Columns 29 and 30, Table 3, row labeled No. 61, seventh cell from left, column labeled Hydrogen desorption peak half-width, "72" should read as -- 72 --.

In Columns 29 and 30, Table 3, row labeled No. 61, twelfth cell from left, column labeled Critical stress/yield stress, "0.98" should read as -- 0.98 --.

In Columns 29 and 30, Table 3, row labeled No. 62, sixth cell from left, column labeled Diffusive hydrogen content in steel, "0.83" should read as -- 0.83 --.

In Columns 29 and 30, Table 3, row labeled No. 62, seventh cell from left, column labeled Hydrogen desorption peak half-width, "86" should read as -- 86 --.

In Columns 29 and 30, Table 3, row labeled No. 62, twelfth cell from left, column labeled Critical stress/yield stress, "0.86" should read as -- 0.86 --.

In Columns 29 and 30, Table 3, row labeled No. 63, ninth cell from left, column labeled TS, "960" should read as -- 960 --.

In Columns 29 and 30, Table 3, row labeled No. 66, sixth cell from left, column labeled Diffusive hydrogen content in steel, "0.68" should read as -- 0.68 --.

In Columns 29 and 30, Table 3, row labeled No. 66, seventh cell from left, column labeled Hydrogen desorption peak half-width, "81" should read as -- 81 --.

In Columns 29 and 30, Table 3, row labeled No. 66, twelfth cell from left, column labeled Critical stress/yield stress, "0.92" should read as -- 0.92 --.

In Columns 29 and 30, Table 3, row labeled No. 67, sixth cell from left, column labeled Diffusive hydrogen content in steel, "0.56" should read as -- 0.56 --.

In Columns 29 and 30, Table 3, row labeled No. 67, seventh cell from left, column labeled Hydrogen desorption peak half-width, "84" should read as -- 84 --.

In Columns 29 and 30, Table 3, row labeled No. 67, twelfth cell from left, column labeled Critical stress/yield stress, "0.90" should read as -- 0.90 --.

In Columns 29 and 30, Table 3, row labeled No. 68, ninth cell from left, column labeled TS, "957" should read as -- 957 --.

CERTIFICATE OF CORRECTION (continued)  
U.S. Pat. No. 11,180,823 B2

In Columns 29 and 30, Table 3, row labeled No. 72, third cell from left, column labeled M+TM, "24" should read as -- 24 --.

In Columns 29 and 30, Table 3, row labeled No. 72, ninth cell from left, column labeled TS, "964" should read as -- 964 --.

In Columns 29 and 30, Table 3, row labeled No. 73, third cell from left, column labeled M+TM, "21" should read as -- 21 --.

In Columns 29 and 30, Table 3, row labeled No. 73, ninth cell from left, column labeled TS, "943" should read as -- 943 --.

In Columns 29 and 30, Table 3, row labeled No. 76, seventh cell from left, column labeled Hydrogen desorption peak half-width, "81" should read as -- 81 --.

In Columns 29 and 30, Table 3, row labeled No. 76, twelfth cell from left, column labeled Critical stress/yield stress, "0.94" should read as -- 0.94 --.

In Columns 29 and 30, Table 3, row labeled No. 77, sixth cell from left, column labeled Diffusive hydrogen content in steel, "0.59" should read as -- 0.59 --.

In Columns 29 and 30, Table 3, row labeled No. 77, twelfth cell from left, column labeled Critical stress/yield stress, "0.99" should read as -- 0.99 --.

In Columns 29 and 30, Table 3, row labeled No. 84, third cell from left, column labeled M+TM, "28" should read as -- 28 --.

In Columns 29 and 30, Table 3, row labeled No. 84, ninth cell from left, column labeled TS, "974" should read as -- 974 --.

In Columns 29 and 30, Table 3, row labeled No. 87, third cell from left, column labeled M+TM, "11" should read as -- 11 --.

In Columns 29 and 30, Table 3, row labeled No. 87, ninth cell from left, column labeled TS, "821" should read as -- 821 --.

In Columns 29 and 30, Table 3, row labeled No. 88, third cell from left, column labeled M+TM, "16" should read as -- 11 --.

In Columns 29 and 30, Table 3, row labeled No. 88, ninth cell from left, column labeled TS, "843" should read as -- 843 --.

In Columns 29 and 30, Table 3, row labeled No. 89, third cell from left, column labeled M+TM, "19" should read as -- 19 --.

In Columns 29 and 30, Table 3, row labeled No. 89, ninth cell from left, column labeled TS, "867" should read as -- 867 --.

In Columns 29 and 30, Table 3, row labeled No. 90, third cell from left, column labeled M+TM, "23" should read as -- 23 --.

In Columns 29 and 30, Table 3, row labeled No. 91, sixth cell from left, column labeled Diffusive hydrogen content in steel, "0.53" should read as -- 0.53 --.

In Columns 29 and 30, Table 3, row labeled No. 91, twelfth cell from left, column labeled Critical stress/yield stress, "0.94" should read as -- 0.94 --.

In Columns 29 and 30, Table 3, row labeled No. 92, sixth cell from left, column labeled Diffusive hydrogen content in steel, "0.59" should read as -- 0.59 --.

In Columns 29 and 30, Table 3, row labeled No. 92, twelfth cell from left, column labeled Critical stress/yield stress, "0.94" should read as -- 0.94 --.

In Columns 29 and 30, Table 3, row labeled No. 95, third cell from left, column labeled M+TM, "24" should read as -- 24 --.

In Columns 29 and 30, Table 3, row labeled No. 95, ninth cell from left, column labeled TS, "782" should read as -- 782 --.

In Columns 29 and 30, Table 3, row labeled No. 96, third cell from left, column labeled M+TM, "25" should read as -- 25 --.

In Columns 29 and 30, Table 3, row labeled No. 96, ninth cell from left, column labeled TS, "954" should read as -- 954 --.

In Columns 29 and 30, Table 3, row labeled No. 97, sixth cell from left, column labeled Diffusive hydrogen content in steel, "0.62" should read as -- 0.62 --.

In Columns 29 and 30, Table 3, row labeled No. 97, twelfth cell from left, column labeled Critical stress/yield stress, "0.97" should read as -- 0.97 --.

In Columns 29 and 30, Table 3, row labeled No. 98, sixth cell from left, column labeled Diffusive hydrogen content in steel, "0.61" should read as -- 0.61 --.

In Columns 29 and 30, Table 3, row labeled No. 98, twelfth cell from left, column labeled Critical stress/yield stress, "0.97" should read as -- 0.97 --.

In Columns 29 and 30, Table 3, row labeled No. 99, sixth cell from left, column labeled Diffusive hydrogen content in steel, "0.72" should read as -- 0.72 --.

CERTIFICATE OF CORRECTION (continued)

In Columns 29 and 30, Table 3, row labeled No. 99, twelfth cell from left, column labeled Critical stress/yield stress, "0.89" should read as -- 0.89 --.

In Columns 29 and 30, Table 3, row labeled No. 100, sixth cell from left, column labeled Diffusive hydrogen content in steel, "0.71" should read as -- 0.71 --.

In Columns 29 and 30, Table 3, row labeled No. 100, twelfth cell from left, column labeled Critical stress/yield stress, "0.89" should read as -- 0.89 --.

In Columns 29 and 30, Table 3, row labeled No. 101, sixth cell from left, column labeled Diffusive hydrogen content in steel, "0.57" should read as -- 0.57 --.

In Columns 29 and 30, Table 3, row labeled No. 101, twelfth cell from left, column labeled Critical stress/yield stress, "0.96" should read as -- 0.96 --.

In Columns 29 and 30, Table 3, row labeled No. 102, sixth cell from left, column labeled Diffusive hydrogen content in steel, "0.58" should read as -- 0.58 --.

In Columns 29 and 30, Table 3, row labeled No. 102, twelfth cell from left, column labeled Critical stress/yield stress, "0.96" should read as -- 0.96 --.

In Columns 29 and 30, Table 3, row labeled No. 103, sixth cell from left, column labeled Diffusive hydrogen content in steel, "0.55" should read as -- 0.55 --.

In Columns 29 and 30, Table 3, row labeled No. 103, twelfth cell from left, column labeled Critical stress/yield stress, "0.97" should read as -- 0.97 --.

In Columns 29 and 30, Table 3, row labeled No. 104, sixth cell from left, column labeled Diffusive hydrogen content in steel, "0.56" should read as -- 0.56 --.

In Columns 29 and 30, Table 3, row labeled No. 104, twelfth cell from left, column labeled Critical stress/yield stress, "0.97" should read as -- 0.97 --.

In Columns 29 and 30, Table 3, row labeled No. 105, sixth cell from left, column labeled Diffusive hydrogen content in steel, "0.54" should read as -- 0.54 --.

In Columns 29 and 30, Table 3, row labeled No. 105, twelfth cell from left, column labeled Critical stress/yield stress, "0.96" should read as -- 0.96 --.

In Columns 29 and 30, Table 3, row labeled No. 106, sixth cell from left, column labeled Diffusive hydrogen content in steel, "0.55" should read as -- 0.55 --.

In Columns 29 and 30, Table 3, row labeled No. 106, twelfth cell from left, column labeled Critical stress/yield stress, "0.97" should read as -- 0.97 --.

CERTIFICATE OF CORRECTION (continued)
U.S. Pat. No. 11,180,823 B2

In Columns 31 and 32, Table 3, row labeled No. 107, sixth cell from left, column labeled Diffusive hydrogen content in steel, "0.61" should read as -- 0.61 --.

In Columns 31 and 32, Table 3, row labeled No. 107, twelfth cell from left, column labeled Critical stress/yield stress, "0.97" should read as -- 0.97 --.

In Columns 31 and 32, Table 3, row labeled No. 108, sixth cell from left, column labeled Diffusive hydrogen content in steel, "0.58" should read as -- 0.58 --.

In Columns 31 and 32, Table 3, row labeled No. 108, twelfth cell from left, column labeled Critical stress/yield stress, "0.95" should read as -- 0.95 --.